(12) United States Patent
Shapira et al.

(10) Patent No.: US 6,640,110 B1
(45) Date of Patent: Oct. 28, 2003

(54) SCALABLE CELLULAR COMMUNICATIONS SYSTEM

(75) Inventors: Joseph Shapira, Haifa (IL); Gideon Argaman, Kirait Tivon (IL)

(73) Assignee: Celletra Ltd., Haifa (IL)

( * ) Notice: Subject to any disclaimer, the term of this patent is extended or adjusted under 35 U.S.C. 154(b) by 0 days.

(21) Appl. No.: 09/357,845

(22) Filed: Jul. 21, 1999

Related U.S. Application Data

(63) Continuation-in-part of application No. 09/171,986, filed as application No. PCT/IL98/00104 on Mar. 3, 1998, and a continuation-in-part of application No. PCT/IL98/00103, filed on Mar. 3, 1998.

(30) Foreign Application Priority Data

| Mar. 3, 1997 | (IL) | ................................................. 120364 |
| Apr. 20, 1997 | (IL) | ................................................. 120706 |
| Jun. 30, 1997 | (IL) | ................................................. 121201 |

(51) Int. Cl.$^7$ ................................................. H04R 1/40
(52) U.S. Cl. ........................ 455/562; 455/561; 342/373
(58) Field of Search ................................ 455/561, 562; 342/373

(56) References Cited

U.S. PATENT DOCUMENTS

| 3,436,691 | A | 4/1969 | Hoffmann et al. |
| 3,491,314 | A | 1/1970 | White |
| 4,647,880 | A | 3/1987 | Argaman |
| 5,017,927 | A | 5/1991 | Agrawal et al. |
| 5,280,472 | A | 1/1994 | Gilhousen et al. |
| 5,420,536 | A | * 5/1995 | Faulkner et al. ............ 330/149 |
| 5,455,537 | A | 10/1995 | Larkin et al. |
| 5,485,120 | A | 1/1996 | Anvari |
| 5,489,875 | A | 2/1996 | Cavers |
| 5,499,395 | A | 3/1996 | Doi et al. |
| 5,513,176 | A | 4/1996 | Dean et al. |
| 5,533,011 | A | 7/1996 | Dean et al. |
| 5,563,610 | A | 10/1996 | Reudink |
| 5,565,873 | A | 10/1996 | Dean |
| 5,576,659 | A | 11/1996 | Kenington et al. |
| 5,579,016 | A | 11/1996 | Wolcott et al. |
| 5,584,049 | A | 12/1996 | Weaver, Jr. et al. |
| 5,588,020 | A | 12/1996 | Schilling |
| 5,592,471 | A | 1/1997 | Briskman |
| 5,596,329 | A | 1/1997 | Searle et al. |
| 5,602,555 | A | 2/1997 | Searle et al. |
| 5,602,834 | A | 2/1997 | Dean et al. |
| 5,612,703 | A | 3/1997 | Mallinckrodt |
| 5,642,353 | A | 6/1997 | Roy, III et al. |
| 5,649,293 | A | 7/1997 | Reed |
| 5,666,123 | A | 9/1997 | Chrystie |
| 5,675,629 | A | 10/1997 | Raffel et al. |
| 5,697,053 | A | 12/1997 | Hanly |
| 5,703,874 | A | 12/1997 | Schilling |
| 5,714,957 | A | 2/1998 | Searle et al. |
| 5,715,516 | A | 2/1998 | Howard et al. |

(List continued on next page.)

FOREIGN PATENT DOCUMENTS

| EP | 722 227 | 7/1996 |
| EP | 766 414 | 4/1997 |
| WO | 96/00991 | 1/1996 |
| WO | 98/39851 | 9/1998 |

*Primary Examiner*—Thanh Cong Le
*Assistant Examiner*—Alan T. Gantt
(74) *Attorney, Agent, or Firm*—Pillsbury Winthrop LLP

(57) ABSTRACT

Certain antenna arrangements are provided, and active radiator units are presented which may form those antenna arrangements. Various subcomponents of such antenna arrangements and active radiator units are provided. Systems and methods, and portions thereof, facilitate the assembling and arranging of antenna elements, active radiator units, and subcomponents of such antenna arrangements and active radiator units. They also facilitate the controlling of the operation of one or more aspects of a communication site, particularly an active radiator unit within a given antenna arrangement.

16 Claims, 22 Drawing Sheets

U.S. PATENT DOCUMENTS

| | | |
|---|---|---|
| 5,721,757 A | 2/1998 | Banh et al. |
| 5,758,090 A | 5/1998 | Doner |
| 5,771,468 A | 6/1998 | Stein |
| 5,777,579 A | 7/1998 | Geotz et al. |
| 5,784,031 A | 7/1998 | Weiss et al. |
| 5,798,675 A | 8/1998 | Drach |
| 5,815,116 A | 9/1998 | Dunbridge et al. |
| 5,832,389 A * | 11/1998 | Dent .......................... 455/562 |
| 5,841,395 A | 11/1998 | Simone |
| 5,848,358 A | 12/1998 | Forssen et al. |
| 5,856,810 A | 1/1999 | Lopez |
| 5,861,844 A | 1/1999 | Gilmore et al. |
| 5,872,548 A | 2/1999 | Lopez |
| 5,889,494 A | 3/1999 | Reudink et al. |
| 5,907,304 A | 5/1999 | Wilson et al. |
| 6,127,972 A * | 10/2000 | Avidor et al. ................ 342/373 |
| 6,157,668 A * | 12/2000 | Gilhousen et al. .......... 375/130 |

\* cited by examiner

SCALABLE CELLULAR COMMUNICATIONS SYSTEM

RELATED APPLICATION DATA

The present application is related to the disclosure provided in the U.S. application entitled "Active Antenna Array Configuration and Control for Cellular Communication Systems" application Ser. No. 09/357,844 filed on even date herewith in the name of Joseph Shapira.

This application is a continuation-in-part of the copending U.S. application Ser. No. 09/171,986, filed Oct. 30, 1998, which was the National Stage of International Application No. PCT/IL98/00104, filed Mar. 3, 1998, which claimed the benefit of (and accordingly, this application also claims the benefit of) each of Israeli Application Nos. 120364, filed Mar. 3, 1997, 120706, filed Apr. 20, 1997, and 121201, filed Jun. 30, 1997.

This application is also a continuation-in-part of the copending PCT International Application No. PCT/IL98/00103, filed Mar. 3, 1998, which claimed the benefit of (and accordingly, this application also claims the benefit of) each of Israeli Application Nos. 120364, filed Mar. 3, 1997, 120706, filed Apr. 20, 1997, and 121201, filed Jun. 30, 1997.

The contents of each and every one of the aforementioned applications are hereby expressly incorporated by reference herein in their entireties.

BACKGROUND OF THE INVENTION

Reservation of Copyright

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

Certain aspects of the invention relate to wireless communications systems. Other aspects of the invention relate to active radiator subsystems which serve as building blocks for cellular base stations. Other aspects of the invention relate to systems and methods for implementing cellular base station systems.

DESCRIPTION OF BACKGROUND INFORMATION

Cellular wireless communications systems provide users with wireless access to voice and data networks throughout a given geographic serving area. Transmit/receive base stations, dispersed throughout the serving area communicate with the users' mobile stations. Usually, each base station serves a certain portion of the serving area, such as a "cell." As a user moves from one cell into an adjacent cell, the call is handed off from the base station assigned to the first cell to the base station assigned to the adjacent cell. There are many types of cellular systems, including advanced mobile phone system (AMPS), code-division multiple access (CDMA), Digital AMPS, global system for mobile communications (GSM), nordic mobile telephone (NMT), total access communications system (TACS), and personal communication systems (PCS). PCS cellular systems may utilize such technologies as DCS 1800, PCS 1900, GSM, personal digital cellular (PDC), IS-661, IS-136, and IS-95, technologies, among others.

The base station covers a given geographical coverage area and connects and controls any mobile station within its coverage area. The base stations serve as a "cell sites" for their respective cells. A cell site typically comprises at least one transmit antenna and at least one receive antenna. Multiple transmission signals are typically connected to the transmitting antenna after being combined with the use of a combiner.

A given cell site radiates power at a controlled level and comprises an antenna positioned at a height sufficient to cover the cell area. This permits frequency reuse of the same channels in non-adjacent cells within the same cellular geographic serving area, while mitigating co-channel interference. A well-coordinated frequency reuse plan enables a large number of simultaneous calls to be handled throughout the cellular geographic serving area. To further increase the traffic capacity that can be handled within a given service area, congested cells can be subdivided into smaller cells, wherein each smaller cell may be provided with its own base station. These smaller cells then use lower transmitter power and antennas with a lower height, thus permitting a greater frequency reuse. These subdivided cells can be split still further for greater frequency reuse. Such cell splitting can be employed with the use of directional antennas, for example, to mitigate interference brought about by increased frequency reuse.

Because mobile stations are likely to be in motion, it is difficult to control the line of sight (LOS) between a given base station and the mobile station. Such motion changes the path characteristics, causing multi-path propagation. Multi-path propagation results in such undesirable effects as multi-path fading and dispersion.

Diversity techniques are used to combat these effects. Some types of diversity used to reduce the effects of fading and to mitigate dispersion include frequency diversity, spatial diversity, time diversity, angle diversity, and polarization diversity. Spatial diversity involves physically separating the antennas by a defined physical separation, which can be either horizontal or vertical.

Polarization diversity involves utilizing two different antenna elements that are polarized in different (e.g., orthogonal) planes. One advantage polarization diversity presents in a mobile communications system is a reduced number of antennas required for an installation.

Time diversity transmits the information at different times, while frequency diversity transmits the information content at different frequencies. Angle diversity varies the angle of arrival of the signal.

There are a number of different access methods used to facilitate full-duplex communication between base stations and mobile stations. They include frequency-division multiple access (FDMA), time-division multiple access (TDMA), and code division multiple access (CDMA). Typically, with each of these access methods, a radio bandwidth segment is allotted, and a portion of the bandwidth is assigned for transmission from a cell site to the mobile stations, (the "forward link"), while another portion is assigned for communication from the mobile station to the cell site (the "reverse link"). The allotted bandwidth segment is placed at a certain position within the frequency spectrum with the use of a carrier signal. Some systems utilize multiple carriers, such as the multicarrier operation of a CDMA network, which maximizes the capacity of the network for the allocated band. The cellular band allows for a maximum of 8 CDMA carriers, while the A, B, C bands allow for 11 carriers each, and the G, E, F bands allow for three carriers each.

FIG. 1 shows a typical wireless communication site for cellular and PSC communications. The illustrated site comprises, among other elements not specifically shown, batteries 12, a control bay 14, a receive bay 16, a transmit bay 18, and a filter bay 20. Cables connecting filter bay 20 to antenna element(s) 26 are passed through a cable tray 22. The antenna element(s) assembly is mounted at the top of a tower/mounting structure 24.

Communication sites such as the one shown in FIG. 1 are more frequently incorporating directional antenna arrangements rather than omni directional antennas. These sites break down omni 360° cells into smaller angular range sectors, such as 120° sectors. These directional systems help to reduce interference due to channel overlap and to increase the transmit and receive distance ranges of the base station. Accordingly, the cells can cover a larger area, and communication signals within each cell are stronger. By way of example, U.S. Pat. Nos. 5,889,494 (Reudink et al.), U.S. Pat. No. 5,565,873 (Dean), and U.S. Pat. No. 5,666,123 (Chrystie) each disclose base station systems utilizing multibeam directional antenna array arrangements.

The antenna arrangements provided at a given communications site will preferably occupy the least amount of space, and be mounted so as to create the least amount of intrusion and nuisance. For example, if the antenna arrangement is mounted at the top of a building, it may block the view of occupants of adjacent buildings. In addition, it is preferred that the antenna arrangement be configured so that it can be easily mounted to structures of various types. The shape, size, and configuration of the antenna arrangement will determine how and whether the arrangement can be mounted to a particular structure. Moreover, because these arrangements are within plain view in many environments, such as in urban environments, it is important that the arrangements be aesthetically pleasant.

In addition, the communications site should preferably be designed so that it utilizes the least amount of power, yet accommodates the full EIRP/range requirements for a given coverage area (e.g., cell or sector). Minimizing power use and reducing transmission losses provide significant advantages to a cellular service provider, such as increasing coverage and improving the quality of communication.

The cost and inconvenience associated with installing, replacing, and upgrading communication sites should not be ignored. Existing cellular base station systems need improvements to make them more easily scalable, customizable, and upgradable.

There is a need for novel and beneficial ways of addressing these issues, and others, in the implementation of cellular base station systems, and more particularly in the implementation of communication sites serving limited coverage areas, such as cells and sectors.

SUMMARY OF THE INVENTION

The present invention is provided to improve upon wireless communications systems. Certain aspects of the present invention are provided to facilitate the implementation and modification of cellular base station systems. In order to achieve these ends, one or more aspects of the present invention may be followed in order to bring about one or more specific objects and advantages, such as those noted below.

One object of the present invention is to provide improvements relating to antenna arrangements in communication sites for cellular wireless communication systems. A further object of the present invention is to provide certain antenna and active radiator subunit arrangements for cellular wireless communications sites. Such arrangements preferably address a number of issues pertaining to cellular wireless communications. Those issues include multipath fading and constraints in the amount of space a given antenna arrangement shall occupy. They also include the aesthetic nature of the antenna arrangement, transmission loss and power usage concerns, the range of coverage provided by a given antenna arrangement, and the cost of manufacturing and assembling various portions of the cellular cell site system. Novel and beneficial features are also desirable to facilitate the scalability, customizability, and reuse of components of a communications site, as well as the upgrading of the communications site.

The present invention, therefore, may be directed to certain antenna arrangements, active radiator units which may be used to form such antenna arrangements, and various subcomponents of such antenna arrangements and active radiator units. Certain aspects of the present invention are also directed to systems and methods, and portions thereof, for assembling and arranging antenna elements, active radiator units, and subcomponents of such antenna arrangements and active radiator units. Still further aspects of the present invention are directed to systems, methods, and portions thereof, for controlling the operation of one or more aspects of a communications site, particularly the active radiator units within a given antenna arrangement.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF THE EXEMPLARY EMBODIMENTS

I. Active Radiator Units (ARUs) and Related Subsystems and Structures

Figure 1:
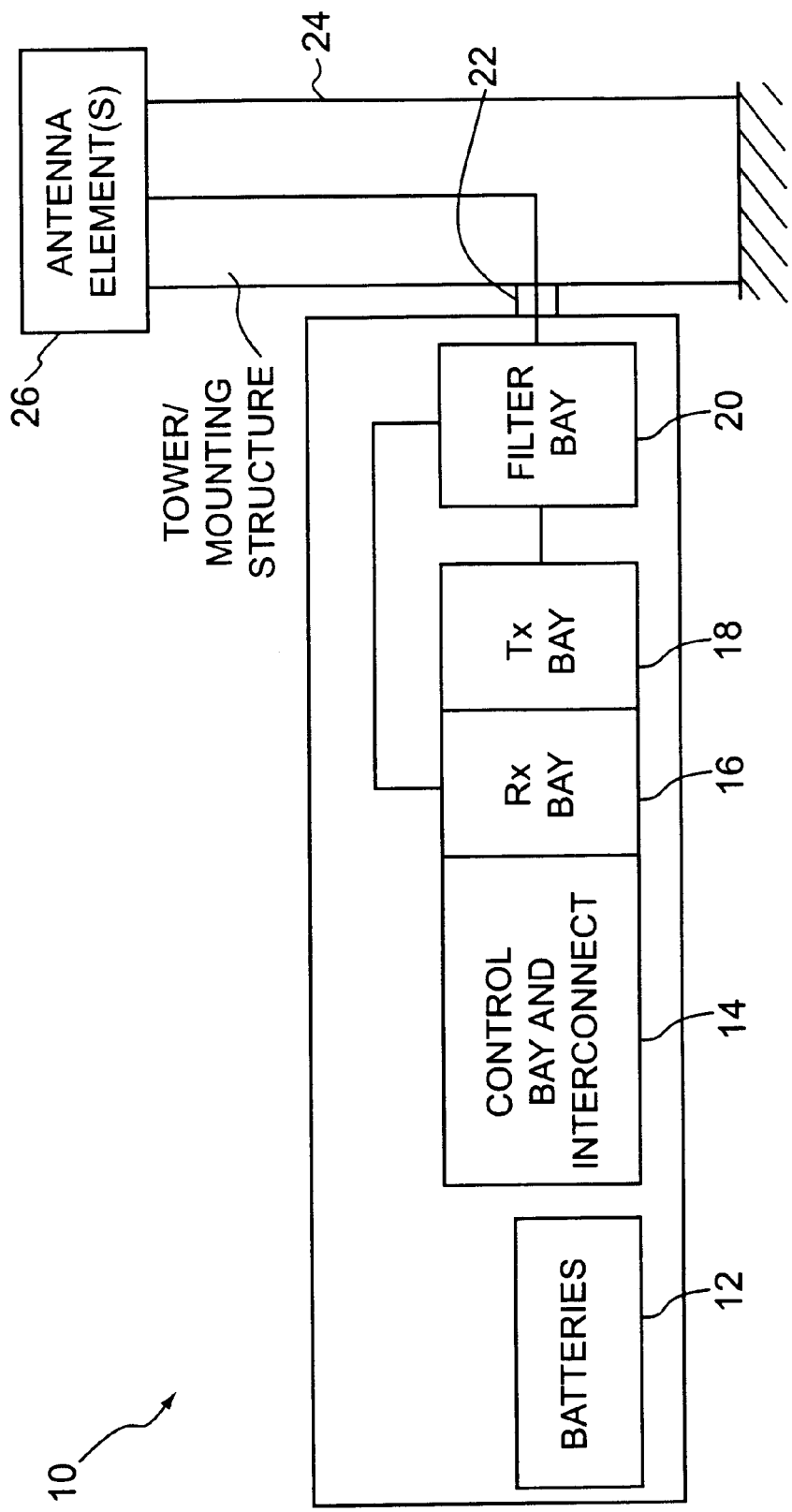
FIG. 1 is a block diagram of a background communication site.
Figure 2:
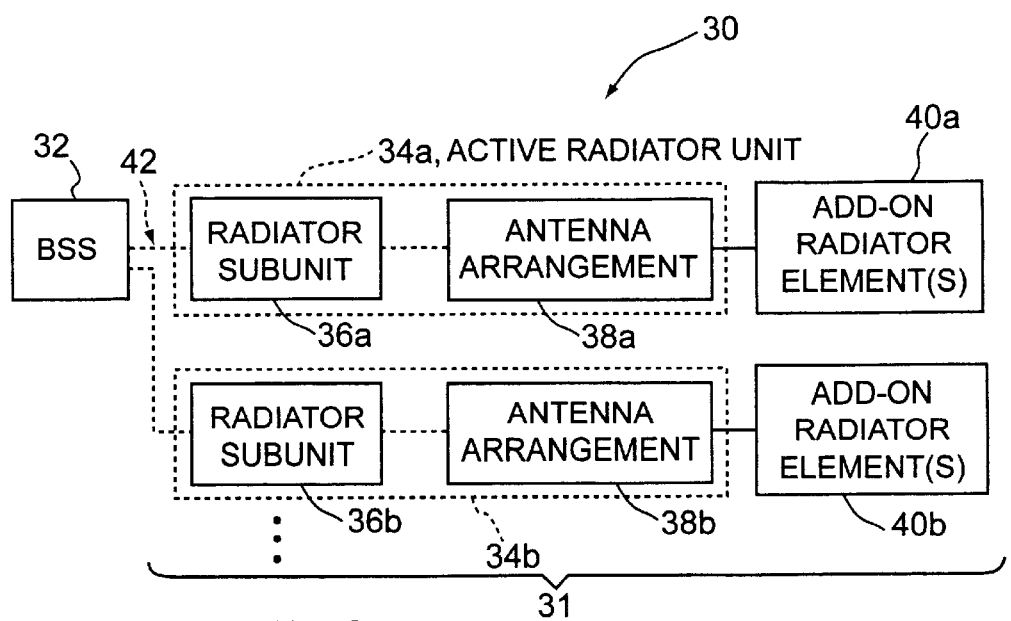
FIG. 2 is a block diagram of a communication site radiator system showing a basic active radiator architecture in accordance with one illustrated embodiment of the present invention.

Referring now to the figures in greater detail, FIG. 2 is a high-level block diagram of a communication site radiator system, which shows a basic active radiator architecture in accordance with one illustrated embodiment of the present invention. A communication site radiator system 30 is shown. A base station system 32 is coupled to a radiator system 31 via signal connections 42. The illustrated radiator system 31 may comprise one or a plurality of active radiator units 34a, 34b, etc. A first active radiator unit 34a comprises a radiator subunit 36a coupled to an antenna arrangement 38a. A second active radiator unit 34b comprises a radiator subunit 36b coupled to an antenna arrangement 38b.

Optional add-on radiator element(s) 40a may be connected to antenna arrangement 38a, and optional add-on radiator element(s) 40b may be coupled to certain portions of antenna arrangement 38b.

Each radiator subunit 36 comprises components for performing amplification of transmit and/or receive signals and filtering of those signals. They may also comprise a controller for optionally controlling certain operations regarding the transmit and receive signals. Each antenna arrangement 38 comprises one or more antenna elements. For example, each antenna arrangement 38 may comprise a transmit antenna and a receive antenna. Generally, the transmission paths provided within the associated radiator subunit 36 will not be greater than the number of transmit antenna elements provided in its associated antenna arrangement 38. In other words, for every transmit path, provided within a given radiator subunit 36, comprising an amplifier and a band pass filter, there will be at least one transmit antenna provided in either or both of the associated antenna arrangement 38 and add-on radiator element(s) 40.

Figure 3:
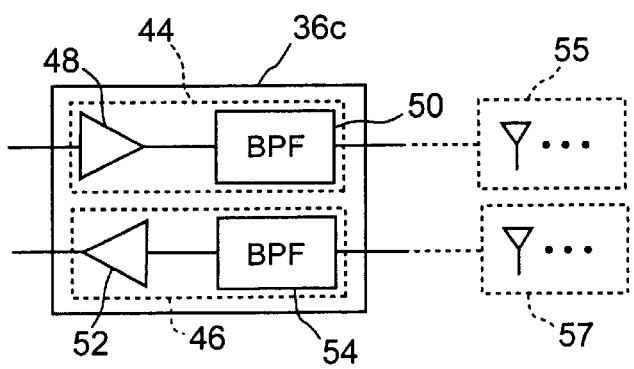
FIG. 3 is a block diagram representing one embodiment of a radiator subunit.

FIG. 3 shows an example radiator subunit 36. The radiator subunit 36 illustrated in FIG. 3 comprises a transmit path portion 44 and a receive path portion 46. The radiator subunits 36a, 3b, etc. illustrated in FIG. 2 may comprise a radiator subunit 36 as shown in FIG. 3, or other variations of a radiator subunit as will be further described below. A given radiator subunit 36 may also comprise a smaller division than that illustrated in FIG. 3. For example, a radiator subunit may comprise one or a plurality of transmit path portions without including any receive path portions, or it may comprise one or a plurality of receive path portions without comprising any transmit path portions.

A single transmit path portion, such as transmit path portion 44 shown in FIG. 3, will comprise at least a transmit amplifier and a transmit band pass filter. As illustrated in FIG. 3, transmit path portion 44 comprises a transmit amplifier 48 and a transmit band pass filter 50. Transmit band pass filter 50 is connected to the output side of transmit amplifier 48. A single receive path portion comprises at least a receive amplifier and a receive band pass filter. In the embodiment shown in FIG. 3, receive path portion 46 comprises a receive amplifier 52 and a receive band pass filter 54. Band pass filter 54 is connected to the input side of receive amplifier 52.

Figure 4:
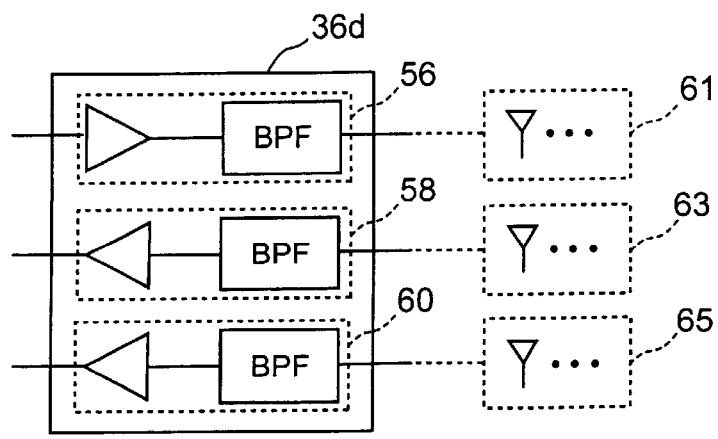
FIG. 4 is a block diagram representing another embodiment of a radiator subunit.

Transmit path portion 44 is coupled to a transmit antenna set comprising one or more transmit antennas, and receive path portion 46 is coupled to a receive antenna set 57, comprising one or more receive antennas. FIG. 4 illustrates another example of a radiator subunit 36d. The illustrated radiator subunit 36d comprises one transmit path portion 56 and two receive portions 58 and 60. Transmit portion 56 is coupled to a transmit antenna set 61, while first receive path portion 58 and second receive path portion 60 are respectively coupled to first receive antenna set 63 and a second receive antenna set 65.

Each transmit path portion within a given communication site radiator system is electrically separated from and independent of the other transmit path portions and the receive path portions. The same goes for each receive path portion. Accordingly, each transmit path portion and each receive path portion comprises an independent connection to its own respective transmit or receive antenna set.

The use of separate antenna elements for transmission versus reception provides certain advantages over the use of a common antenna element for both of these functions. When a common antenna element is used for both transmission and reception, a certain type of intermodulation occurs due to high power transmit signals. This intermodulation is embodied in the form of intermodulation signals generated in the receive band on the surface of the antenna. When this occurs, the receive filter, which is typically provided within a duplexer, will be unable to filter them out. Another disadvantage of using common antenna elements include the inability to provide for different antenna gains for transmit versus receive signals, which may be beneficial in order to obtain a link balance to provide the same coverage for both transmission and reception.

When separate antenna elements or arrangements are used for transmission and reception, respectively, there will be less transmit and receive filter loss, and therefore better performance. In addition, the filter size may be made smaller, depending upon the filter technology. Separation of the transmit and receive elements also allows beam shaping to be employed with the transmit antenna elements (for example, to avoid interference into an adjacent cell), while the same or different beam shaping (or no beam shaping) is employed with the receive antenna elements.

The independent/separate relationship between the transmit path portions and the receive path portions provides certain advantages over other systems. Duplexers are not necessary with this configuration. In addition, the transmit and receive elements may be spatially separated from each other in order to provide a substantial amount of isolation therebetween, for example, on the order of 20 dB of extra transmit isolation. Separating the transmit path portions and receive path portions from themselves and from each other provides more flexibility for cellular site optimization schemes, such as independent beam shaping on the transmit and receive antenna elements.

The receive band pass filters and transmit band pass filters further isolate the transmit channels from the receive channels. This isolation assures that only a small fraction of the transmit power (signal or noise) will be sensed at the input of the receive amplifier, which assures that the system noise figure will not degrade due to excess noise or desensitization effects. The transmit and receive band pass filters also provide RF front-end filtering required by the BTS transceiver which forms part of the base station system 32 (see FIG. 2) coupled to radiator system 31.

Referring back to FIG. 2, in the illustrated embodiment, radiator system 31 is installed at the top of a given tower/ mounting structure. This reduces the need for expensive, heavy, and low-loss interconnect RF coaxial cable which may otherwise be needed to ensure proper performance of the base-station transceiver. For this purpose, transmit and receive amplifiers (e.g., see transmit amplifier 48 and receive amplifier 52 as shown in FIG. 3) have enough excess gain to compensate for the higher loss cable. In addition, in order to improve the receiver system noise figure, the receive amplifier (e.g., receive amplifier 52 as shown in FIG. 3) has a very low noise figure and is connected almost directly, via a receive band pass filter, to its associated receive antenna element(s).

In the alternative embodiments of FIGS. 3 and 4, each receive amplifier comprises a low noise amplifier with a high intercept point, and is designed to handle several cellular channels simultaneously without significant performance degradation. In addition, each transmit amplifier comprises a linearized power amplifier, which may be specifically implemented as further described hereinbelow—e.g., capable of delivering up to two Watts, average, at the input to its associated transmit antenna element(s).

Referring back to FIG. 2, each of radiator subunits 36 may be implemented in the form of a single integrated structural module which is sealed and thus protected from the outside environment. In addition, or alternatively, each active radiator unit may be enclosed in a modular housing structure, which may be designed so as to seal all of the items contained therein from the environment. Accordingly, independently enclosed modules may have transmit path portions and/or receive path portions contained therein.

Figure 5:
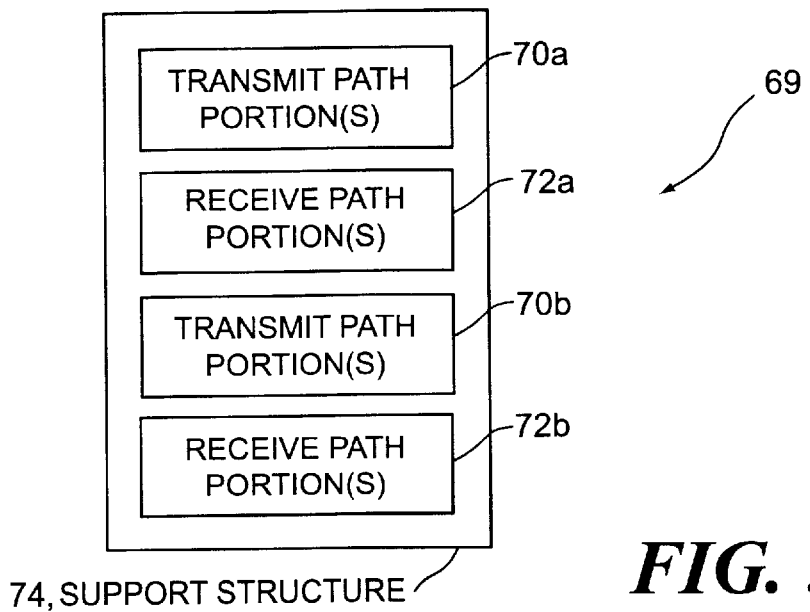
FIG. 5 is a block diagram illustrating a modular radiator system.

FIG. 5 is a schematic representation of one example of a modular radiator system 69, comprising an assembly of transmit radiator subunit modules and receive radiator subunit modules. First and second transmit radiator subunit modules 70a, 70b are interleaved with first and second receive radiator subunit modules 72a, 72b. All of the illustrated modules are mechanically connected to and supported by a common support structure 74.

Figure 6A:
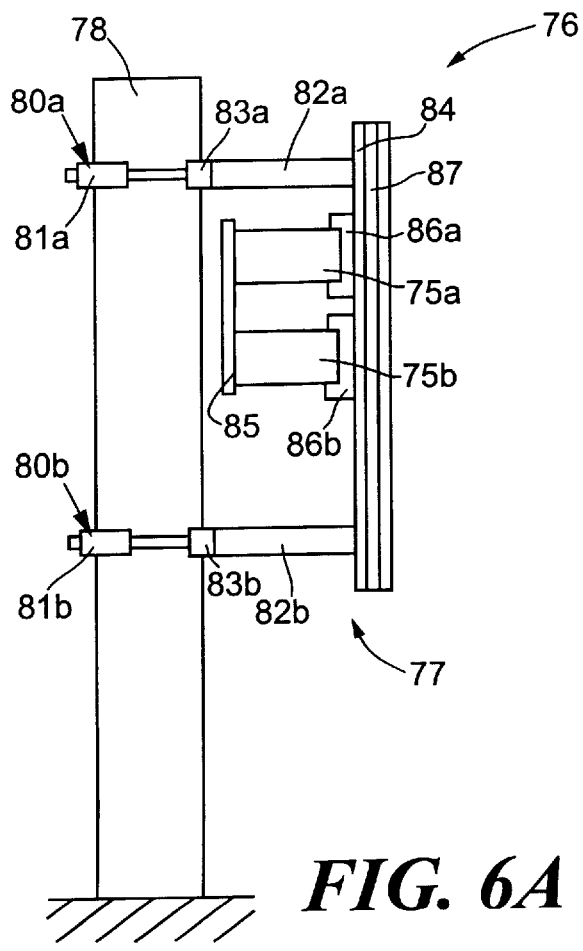
FIG. 6A is an elevated side view of a mounted radiator subsystem.

FIG. 6A shows, by way of an illustrative non-limiting example, a mounted radiator sub-system with two modular radiator subunits. The mounted system comprises first and second radiator subunit modules 75a, 75b supported by a mounting structure 77 mounted to a support pole 78. A rear combiner 85 is provided at the back of the subunit modules. A reflector 87 is mounted around the four sides of radome 84, and serves as a ground plane to shape the radiation pattern and reduce the backward radiation. Support pole 78 is connected to a support structure, tower, mast, or building at which the communications site is located. The illustrated support structure 77 comprises upper and lower lateral support members. First and second upper lateral support members 82a are provided, and are fixed at respective first ends to a radome 84 and at respective second ends to a first clamp structure 80a. First and second lower lateral support members 82b are fixed at respective first ends to radome 84 and at respective second ends to a second clamp structure 80b.

Each of first and second radiator subunit modules 75a, 75b is fixed to radome 84 by means of a respective radome mounting structure 86a, 86b.

By way of example, radome mounting structures 86a and 86b may comprise flanges integrally provided at one end of each radiator subunit module 75a, 75b, and threaded nut-bolt fasteners securing each of the flanges to a portion of radome 84.

In addition, each of upper and lower clamp structures 80a, 80b may be fixed to support pole 78 by tightening an outer C-shaped member 81a, 81b in relation to a corresponding inner C-shaped member 83a, 83b. An aesthetically pleasing outer housing structure (not shown) may be provided which covers mounted radiator system 76.

Figure 6B:
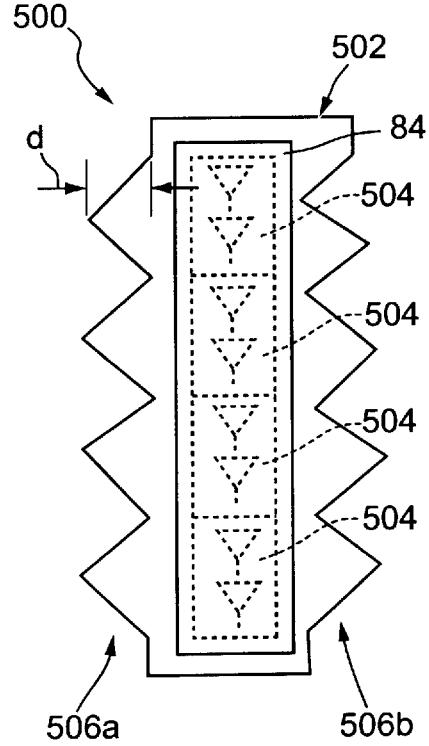
FIG. 6B is a front view of the radiator assembly shown in FIG. 6A.

FIG. 6B illustrates an elevated front view of a radiator assembly 500 comprising a serrated reflector 502, a radome 8 and a plurality of transmit-receive antenna arrangement pairs 504. The illustrated reflector runs along the sides of radome 84, and comprises, along the lateral sides of the array, respective serration sets 506a, 506b. In the illustrated embodiment, the lateral dimension "d" of each of the serrations is one half the wavelength of the cellular or PCS carrier, which is about 7.5 cm for the PCS band. As shown, the serrations along the left side are positioned in an anti-symmetrical relation to those along the right side. The serration features further facilitate the reduction of backward radiation.

Figure 7:
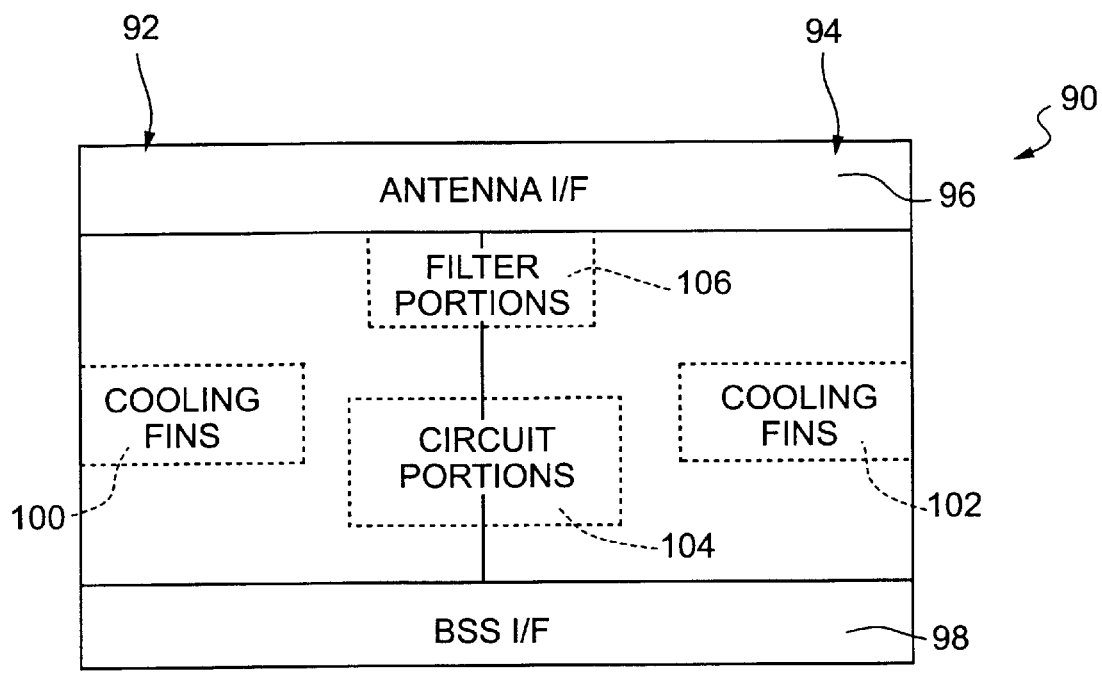
FIG. 7 is a schematic representation of a module housing structure.

FIG. 7 provides a general schematic representation of a module housing structure in accordance with one example embodiment. The illustrated module housing structure 90 comprises a transmit side 92 and a receive side 94. The illustrated module housing structure 90 encloses/encompasses a given radiator subunit, which comprises a set of transmit path portions and a set of receive path portions. The transmit path portions are housed in the transmit side, while the receive path portions are housed in the receive side. An antenna interface 96 is provided at one end of module housing structure 90, and a BSS interface 98 is provided at the opposite end. Sets of cooling fins 100 and 102 are provided at outer surface portions of each of transmit side 92 and receive side 94, for facilitating the cooling of the inner circuitry and power consuming components housed by the illustrated module housing structure 90. Circuit portions 104, which comprise the circuit components of the transmit and receive path portions, are housed in a central portion of the illustrated housing structure, while filter portions 106 are located between antenna interface 96 and the illustrated circuit portions 104.

The illustrated module housing structure 90 should be designed to have a volume and dimensions, as well as a material type, to assure proper heat conduction and convection away from power-emitting elements contained therein. By way of example, transmit side 92 and receive side 94 may be connected to each other with a conductive sealing O-ring therebetween. In the illustrated embodiment, both of these portions are made of die-cast aluminum. Antenna elements and a radome are attached to the front of housing structure 90 via antenna interface 96. Transmit and receive connections to the BSS are made at BSS interface 98.

Figure 8:
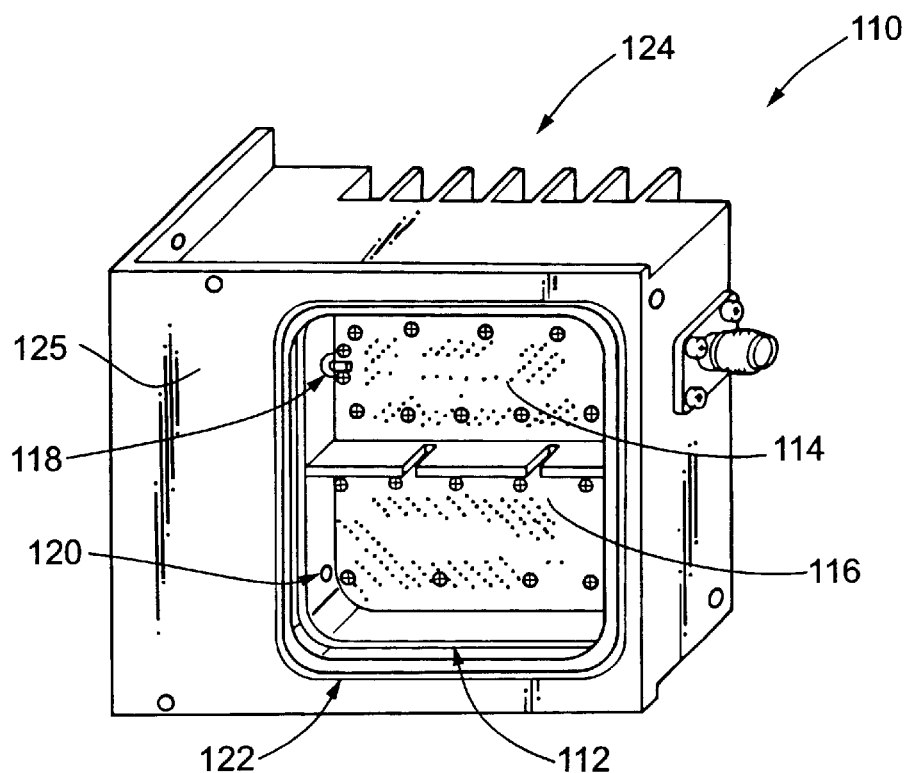
FIG. 8 is a more detailed perspective view of an illustrated transmission block.

FIG. 8 provides a more detailed perspective view of an illustrative transmission block 110. The right side of the illustrated block comprises the BSS side, while the left side comprises the antenna side. The illustrated transmission block 110 comprises a viewable cavity 112 within which an RF amplifier printed circuit board (PCB) and a power supply PCB 116 are each housed. A filter connection 118 is shown, which comprises a point at which RF amplifier 114 is connected to a transmit band pass filter (not shown in FIG. 8), and an antenna connection and tuning knob 120 are as provided as well. A conductive sealing O-ring 122 is provided at the periphery of cavity 112. Cooling fins 124 protrude outwardly from an outer side of the illustrated transmission block 110. A receive block (not shown) which mates with transmission block 110 as illustrated in FIG. 8 simply comprises the same basic structure as that shown in FIG. 8, but in a reversed manner. For example, a receive block may be provided with a cavity portion comprising a receive RF amplifier PCB, as well as a PCB for other circuitry forming part of the radiator subunit, e.g., control circuitry. Filter and antenna connections will need to be provided between the appropriate PCBs and a front portion of the receive block which contains the receive filter. The receive block is also provided with an interface surface which mates with the interface surface of transmit block 110, forming a sealed enclosure.

Of course, the specific structures shown in FIGS. 6–8 are merely provided for illustrative purposes, and are not meant to limit the manner in which the radiator subunit may be implemented in the form of modules and assembled to form radiator systems.

Figure 9:
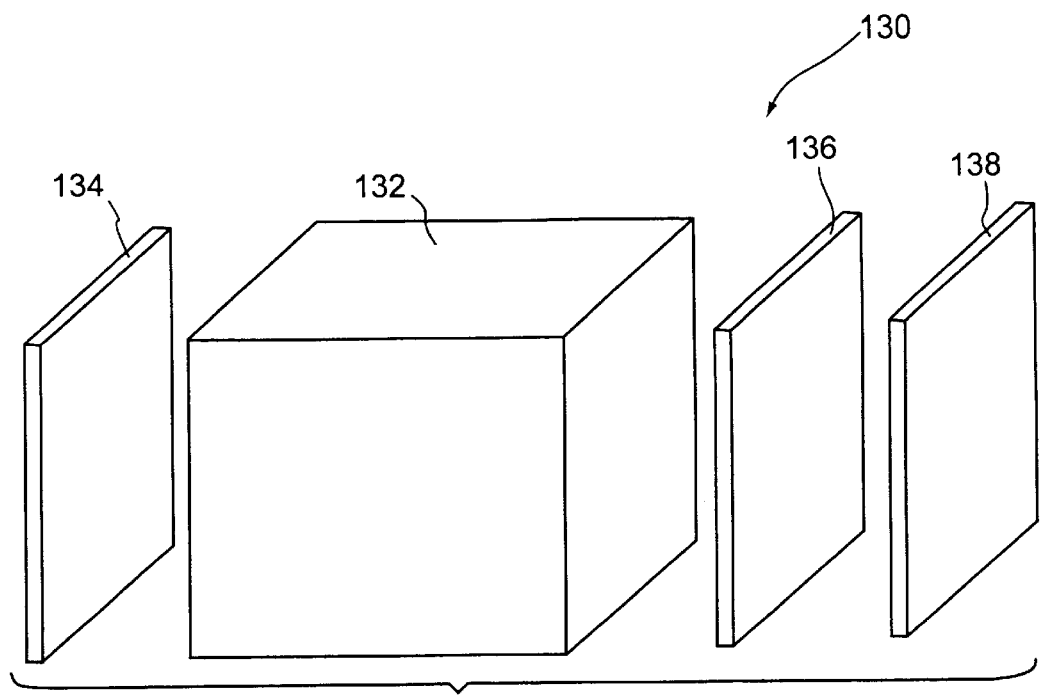
FIG. 9 is an elevated perspective view of a modular assembly.

FIG. 9 shows a modular assembly 130 comprising a radiator subunit module 132 which contains at least one radiator subunit. The modular assembly comprises a rear splitter/combiner 134 which is both mechanically and electrically coupled to a rear side of radiator subunit module 132, and a front splitter/combiner 136 which is mechanically and electrically coupled to the front of radiator subunit module 132. Alternatively, instead of using a PCB, cables and modular splitter combines may be used. Rear splitter/combiner 134 comprises a PCB plate with a conductive pattern formed thereon and portions which receive pins for electrically connecting those conductive patterns with certain portions of the circuitry provided within radiator subunit module 132. The resulting connections perform functions such as splitting and combining of signals from and to the receive and transmit path portions of radiator subunit module 132. Similarly, front splitter/combiner 136 may comprise a PCB with a conductive pattern formed thereon and conductive pins for coupling those patterns to appropriate portions of the circuitry contained within subunit module 132. Those patterns serve the functions of respectively splitting and combining from and to transmit and receive path portions of the radiator subunit contained within radiator subunit module 132. Antenna plate 138 may also comprise a PCB board or layers thereof with antenna patterns formed thereon. Pins may be coupled between the appropriate conductive portions of the pattern on front splitter/combiner 136 and corresponding portions of the antenna pattern formed on antenna plate 138. Each of the plates 134, 136 and 138 is preferably provided with recesses or other mechanisms for allowing the mechanical attachment of those plates to radiator subunit module 132. For example, threaded bolts or screws may be inserted through recesses provided in each of the plates and screwed into threaded bores provided within the peripheral portions of the front and back sides of radiator subunit module 132.

Figure 10:
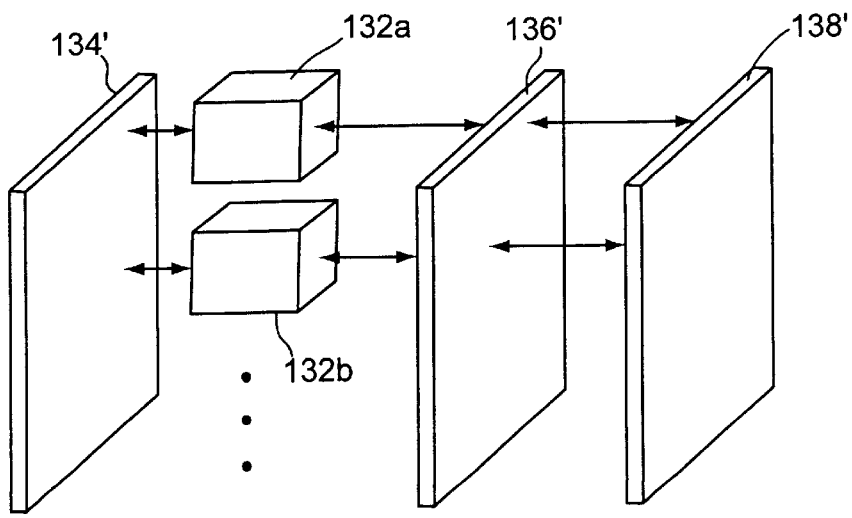
FIG. 10 provides a perspective view of another version of a modular assembly.

Each of plates 134, 136, and 138 may be provided with dimensions extending in length, so as to accommodate a plurality of radiator subunit modules 132. That is, a common set of plates 134, 136 and 138 may be used for an array of subunit modules 132. This is shown in FIG. 10, where rear-splitter/combiner 134', front splitter/combiner 136', and antenna plate 138' are each longer, and are provided with patterns for coupling to a plurality of radiator subunit modules 132a, 132b, and so on.

Antenna elements and the connections thereto may be added to antenna plate 138/138' and front splitter/combiner 136/136' in order to increase the gain of the antenna arrangement. This may be done, e.g., by extending those plates further upward and downward, and providing the connections and the additional antenna elements to the extended portions.

Figure 11:
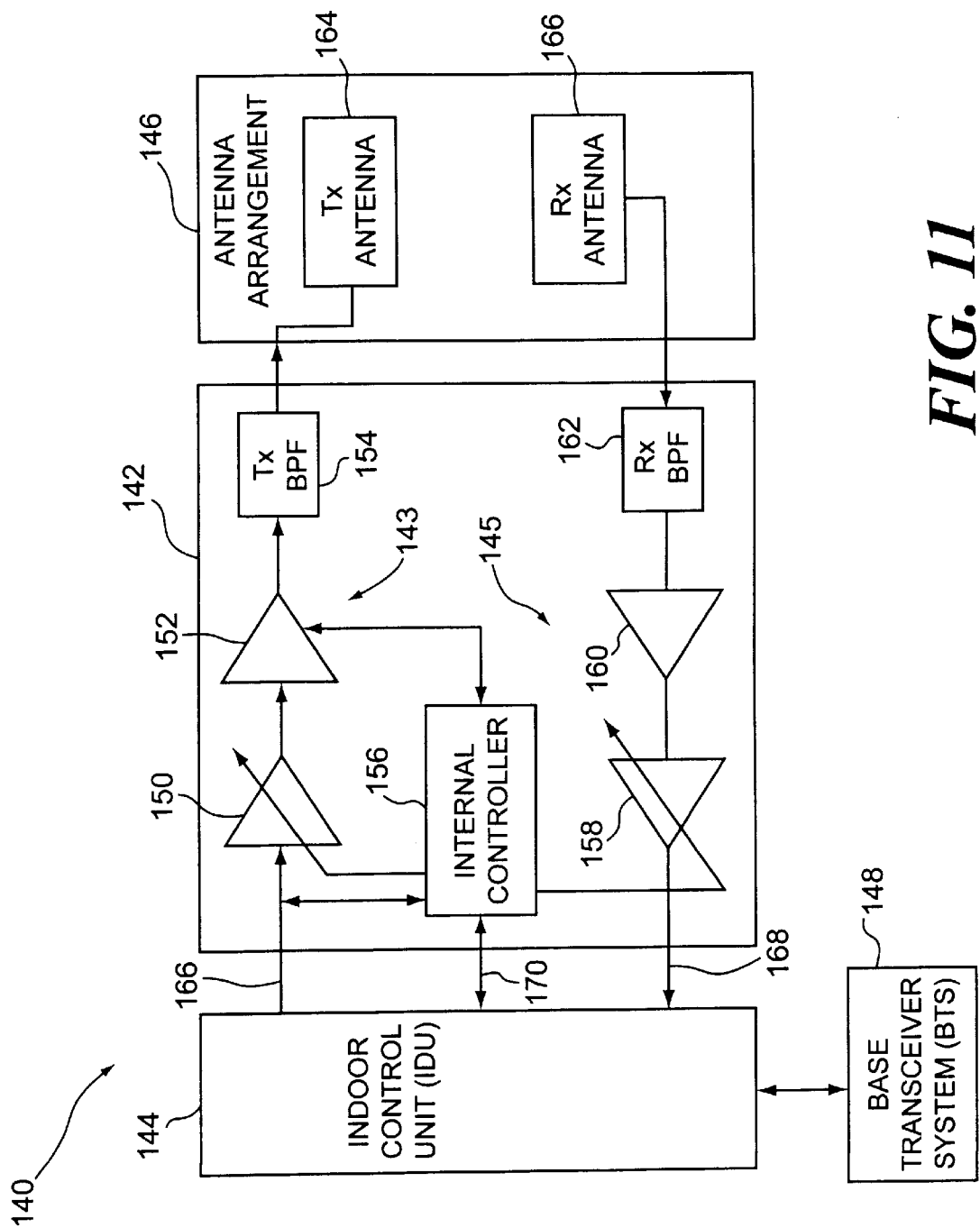
FIG. 11 is a block diagram of a communication site with a specific illustrated embodiment of a radiator system.

FIG. 11 is a block diagram of a communication site with a specific illustrated embodiment of a radiator system. The illustrated communications site 140 comprises a radiator system comprising an indoor control unit (IDU) 144 coupled to a radiator subunit 142, which is in turn coupled to an antenna arrangement 146. A base transceiver system (BTS) 148 is connected to IDU 144. The illustrated radiator subunit 142 comprises a transmit path portion 143 and a receive path portion 145.

Transmit path portion 143 comprises a variable gain transmit amplifier 150, a linearized power amplifier 152, and a transmit band pass filter 154. The output of variable gain transmit amplifier 150 is connected to the input of linearized power amplifier 152. The output of linearized power amplifier 152 is connected to the input of transmit band pass filter 154. The output of transmit band pass filter 154 is connected to transmit antenna 164.

Receive path portion 145 comprises a variable gain receive amplifier 158, a linear low noise amplifier 160 and a receive band pass filter 162. The input of variable gain receive amplifier 158 is connected to the output of linear low noise amplifier 160. The input of linear low noise amplifier 160 is connected to the output of receive band pass filter 162. The input of receive band pass filter 162 is coupled to receive antenna 166.

IDU 144 is responsible for interfacing radiator subunit 142 with BTS 148, and for monitoring and controlling various aspects of radiator subunit 142. Accordingly, the connections between IDU and radiator subunit 142 include a transmit signal path 166, a receive signal path 168, and an overhead data path 170. Transmit signal path 166 carries the transmit signal originating from BTS 148 and inputs it into the input of variable gain transmission amplifier 150. Receive signal path 168 carries a receive signal output by variable gain receive amplifier 158, and inputs that signal to IDU 144, which forwards the signal to BTS 148.

In the illustrated embodiment, IDU 144 performs a number of functions. It serves as an RF interface between each radiator subunit 142 and BTS 148. In this regard, IDU 144 facilitates base station compatibility between radiator subunits 142 and various proprietary or vendor specific BTSs 148. IDU 144 further performs monitoring and control functions, monitoring and controlling various aspects of the radiator subunits 142 to which it is connected. The illustrated IDU 144 is also responsible for the supply of DC voltage to radiator subunits 142. For purposes of simplification, the DC voltage connection is not shown in FIG. 11. IDU 144 may be also provided with various interfaces to networks such as a PSTN, to a network management system, to an alarm and notification system, and to other computing devices, such as personal computers. The specifically-illustrated IDU will be further described hereinbelow.

Variable gain transmit amplifier 150 comprises a digitally controlled variable gain amplifier. Variable gain receive amplifier 158 also comprises a digitally controlled variable amplifier. Each of variable gain transmit amplifier 150 and variable gain receive amplifier 158 can be controlled by internal controller 156. In the illustrated embodiment, internal controller 156 places a value in a register which holds a digital value. The register is provided within each of variable gain transmit amplifier 150 and variable gain receive amplifier 158. When the value within each of the respective registers is updated, the setting for that amplifier is changed.

Linear low noise amplifier 160 may comprise, for example, a low noise amplifier with a high intercept point, designed to handle several carriers/frequency allocation simultaneously without a significant performance degradation. Linearized power amplifier 152 comprises a small size linear amplifier which is self-contained and sealed for outdoor operation. It comprises a wide bandwidth—comprising at least the whole operator-allocated band. The linearized power amplifier 152 handles multi-carriers within the band, to within the power rationale. It provides a maximum amount of power amplification while complying with reliability, heat dissipation, and linearity requirements. For example, the illustrated linearized power amplifier 152 may provide a minimum of two Watts linear power per unit.

Transmit band pass filter 154 serves two roles. The first is to reduce the transmit wide band noise which falls within the receive band. The second is to reduce spurious signals which might interfere with the receive channel of a same cell or other base terminals, including base stations of competitors. The requirement of reducing the transmit wide band noise in the receive band is a more demanding requirement. Accordingly, the structure of transmit band pass filter 154 is dictated by the first requirement. The illustrated transmit band pass filter 154 is designed so that the transmit noise leaking into the receive channel input (i.e., the input to receive band pass filter 162) is lower or equal to a receive noise floor.

Receive band pass filter 162 serves two roles. The first is to reduce the transmit signal to a level which does not interfere with the receive signal causing intermodulation and possible desensitization of the receiver channel. The other purpose of receive band pass filter 162 is to reduce interfering signals from other base stations and mobile stations.

As noted above, IDU 144 comprises an IDU monitoring and control portion. The IDU monitoring and control portion is coupled to the internal controllers of each of the radiator subunits to which the IDU is connected.

II. Monitoring and Control Features

Figure 12:
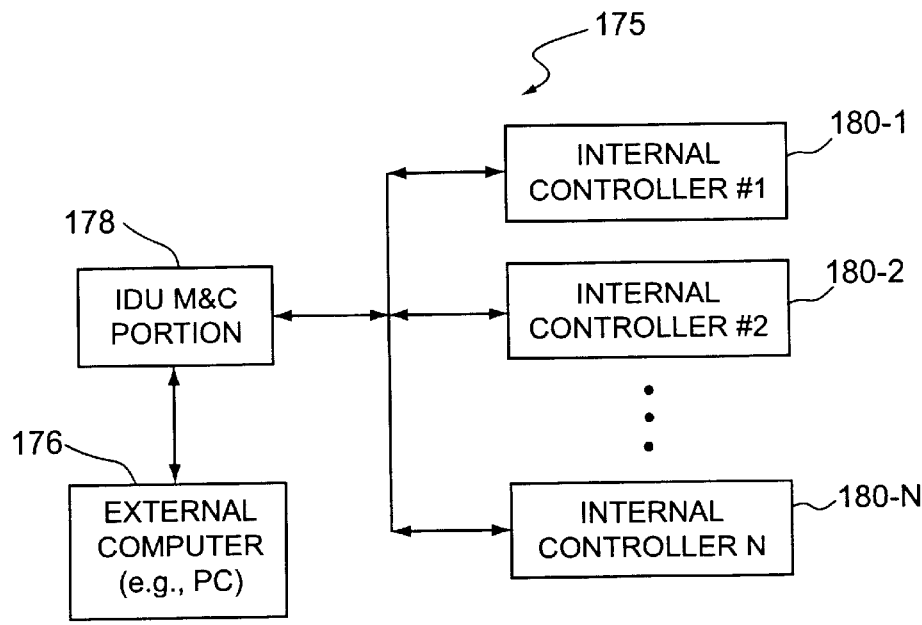
FIG. 12 is a block diagram of a monitoring and control system.

FIG. 12 is a block diagram of a monitoring and control system 175. The illustrated monitoring and control system 175 comprises an external computer 176, an IDU monitoring and control (M&C) portion 178, and a plurality of internal controllers 180-1, 180-2, . . . 180-N. M&C portion 178 is coupled to each of the internal controllers, which form part of a respective radiator subunit, such as radiator subunit 142 as shown in FIG. 11. While this embodiment provides for an external computer 176, the functionality performed by that computer can be handled elsewhere, e.g., as part of a BTS system.

Each internal controller 180 performs certain internal monitoring and control functions. In the illustrated embodiment, each internal controller controls a transmit gain compensation of linearized power amplifier 152, over temperature. It further controls the transmit amplifier linearization of linearized power amplifier 152. Each internal controller also handles thermal over-load protection of its respective radiator subunit, and controls linear low noise amplifier 160 in order to compensate the receive gain with respect to temperature changes.

Each internal controller performs certain monitoring a control functions and outputs information to IDU M&C portion 178. Those functions include the monitoring of transmit output power and outputting that information to IDU monitor and control portion 178. Other information monitored and provided to IDU M&C portion 178 includes transmit input power, the transmit power amplifier current, the temperature of the radiator subunit, and the current of the receive amplifier.

IDU M&C portion 178 controls various aspects of the radiator subunits by interacting with certain internal controllers. Some of the inputs from IDU M&C portion 178 to the respective internal controllers include instructions controlling the transmit amplifier gain, shutting down the transmit amplifier, and shutting down the transmit correction amplifier. In addition, IDU M&C portion 178 can control the receive amplifier gain.

Figure 13:
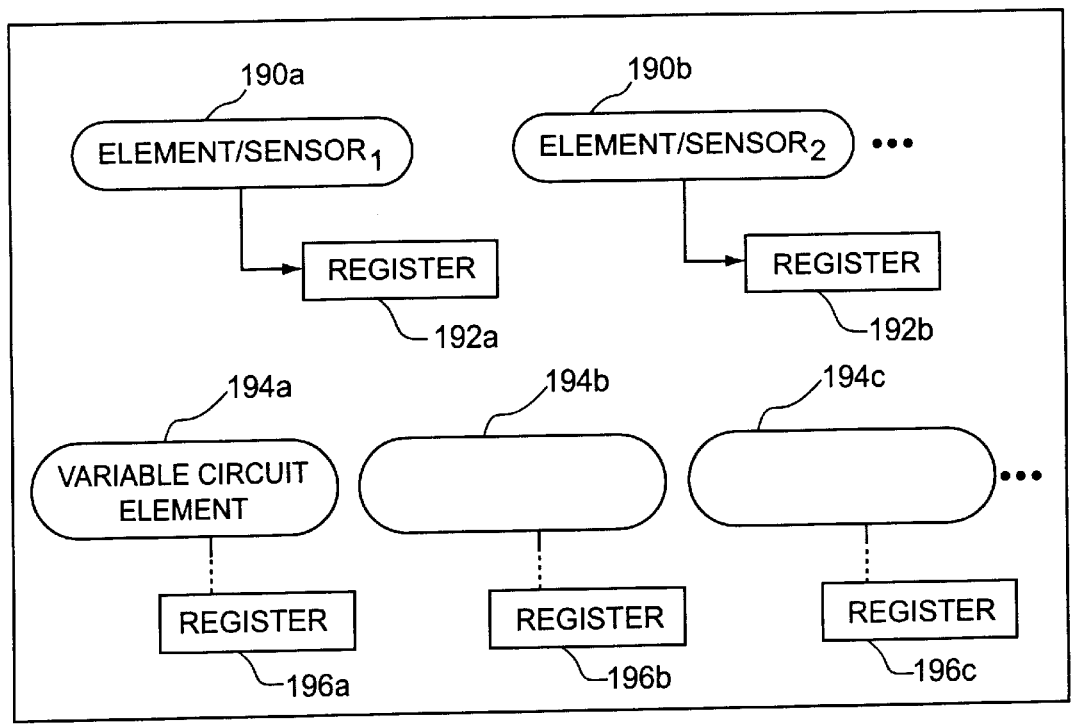
FIG. 13 is a high level schematic representation of monitor and control circuit elements of an active radiator subunit.

FIG. 13 provide a high-level functional representation of the monitor control portions of the circuit elements that may be provided within a given radiator subunit. As shown in FIG. 13, a given radiator subunit may comprise a plurality of elements/sensors 190a, 190b, etc., coupled to respective sense/monitor registers 192a, 192b, etc. In addition, each radiator subunit comprises one or more variable circuit elements 194a, 194b, 194c, etc., coupled to respective control value registers 196a, 196b, 196c, etc. By way of example, an element/sensor 190a may comprise a temperature sensor provided as part of linear low noise receive amplifier 160 for sensing the current passing through that amplifier. Variable circuit element 194a may comprise, for example, the gain control input portion of variable gain receive amplifier 158 of the radiator subunit 142 shown in FIG. 11.

An external computer 176 may be coupled to IDU M&C portion 178, and external computer 176 may comprise a mechanism which allows the user to choose from a variety of M&C functions and reporting options in order to obtain information and in order to control various aspects of the monitor and control functionality as performed by IDU M&C portion 178 in conjunction with each of the internal controllers to which it is connected.

Figure 14:
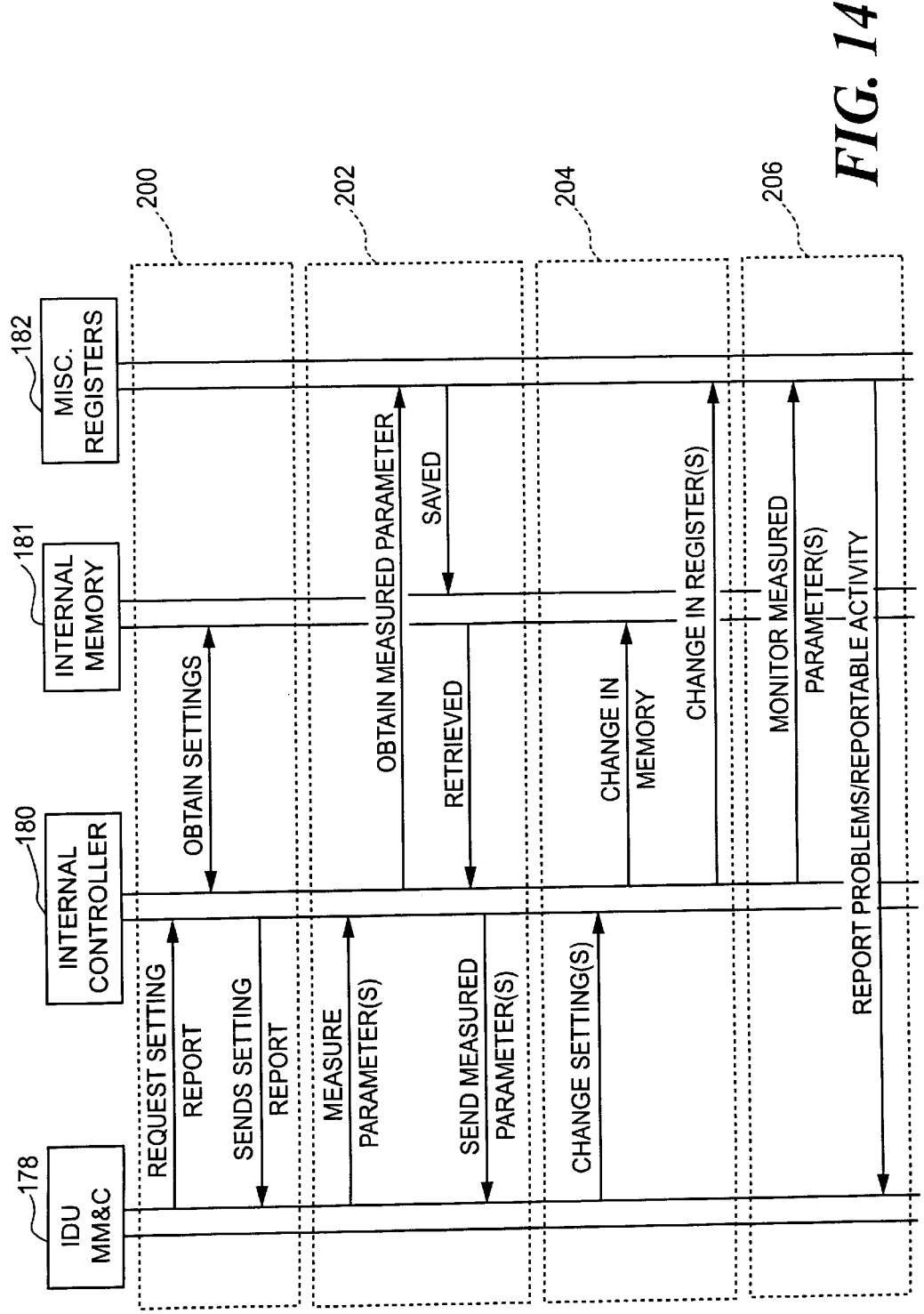
FIG. 14 is a monitor and control dialog/process diagram.

FIG. 14 provides some examples of the interactions which may occur between IDU M&C portion 178, internal controller 180, an internal memory 181, and miscellaneous registers 182. In the illustrated embodiment, internal memory 181 is provided as part of a radiator unit and is an erasable non-volatile memory of suitable size. Internal memory 181 may comprise, for example, a flash memory. Miscellaneous registers 182 comprise the fence/monitor sensors 192 and control value registers 196 illustrated in FIG. 13.

The illustrated dialogs include a "setting request" dialog 200, a "measure parameters" dialog 202, a "change settings" dialog 204, and a "monitor measured parameters" dialog 206.

The order of the dialogs illustrated in FIG. 14 has no specific meaning. Each of the illustrated dialogs can occur on its own, or in any particular point in time in relation to the other dialogs that are performed by the monitor and control system, without regard to the order shown in FIG. 14. As shown in FIG. 14, when a "setting request" is initiated by IDU M&C portion 178, that request is communicated from IDU M&C 178 to internal controller 180. Internal controller 180 then interacts with internal memory 181 in order to obtain setting information, which is stored within internal memory 181. The obtained setting information is sent from internal controller 180 to IDU M&C 178 in the form of a report. It is noted that once a given variable circuit element 194 (see, FIG. 13) is set, and a control value is stored in the associated control value register 196, that setting information is stored within internal memory 181, for retrieval by various processes as needed, such as the case when a "setting request" is sent by IDU M&C 178.

A "measured parameters" dialog is commenced when IDU M&C 178 forwards a request to internal controller 180. Upon receiving that request, internal controller 180 will take steps to have the measured parameter red from the appropriate sense/monitor register 182. The measured parameters are then saved to internal memory 181 and retrieved from internal memory 81 by internal controller 180. The measured parameters are then sent from internal controller 182 to IDU M&C 178.

A "change settings" dialog/process is initiated when a change settings request is sent from IDU M&C 178 to internal controller 180. Information stored in internal memory 181 concerning those settings is changed by internal controller 180. Then, the corresponding registers are changed to agree with the new settings.

Measured parameters are periodically monitored by internal controller 180. When they are monitored, and when a certain problem or reportable activity is placed within a given register, a report is generated and forwarded to IDU M&C 178.

The above-described embodiment of a monitoring and control system 175 as shown in FIG. 12 allows the controlling of the proper operation of a set of radiator subunits 142, and enables a real-time duplex communication between individual radiator subunits 142 and an external computer. The duplex communication between IDU M&C portion 178 and each of the internal controllers may be established through a communication channel (e.g., FSK) multiplexed on the Rx and/or Tx coaxial cables (or other cables) connecting the individual radiator subunit to the IDU.

III. The Transmit Linearized Power Amplifier (LPA)

The linearized power amplifier described above may be implemented in accordance with known techniques concerning feedforward power amplifier architecture and adaptive control. The following U.S. patents and papers (references) are listed to present examples of such techniques, which may be incorporated into one or more of the embodiments disclosed herein, and accordingly, each such reference is hereby expressly incorporated by reference herein in its entirety: U.S. Pat. No. 5,576,659 (Kenington et al.); U.S. Pat. No. 5,455,537 (Larken et al.); U.S. Pat. No. 5,485,120 (Anvari); U.S. Pat. No. 5,489,875 (Cavers); D. Willis "Control System for a Feed Forward Amplifier," Microwave Journal, April 1998 pp. 22–34; J. K. Cavers "Adaption Behavior of a Feed Forward Amplifier Linearizer" IEEE VT-44, No. 1, pp. 31–40 February 1995; and J. K. Cavers et al. "A Wide Band Architecture For Adaptive Feed Forward Linearization" Proceedings of IEEE VTC 98.

Figure 15A:
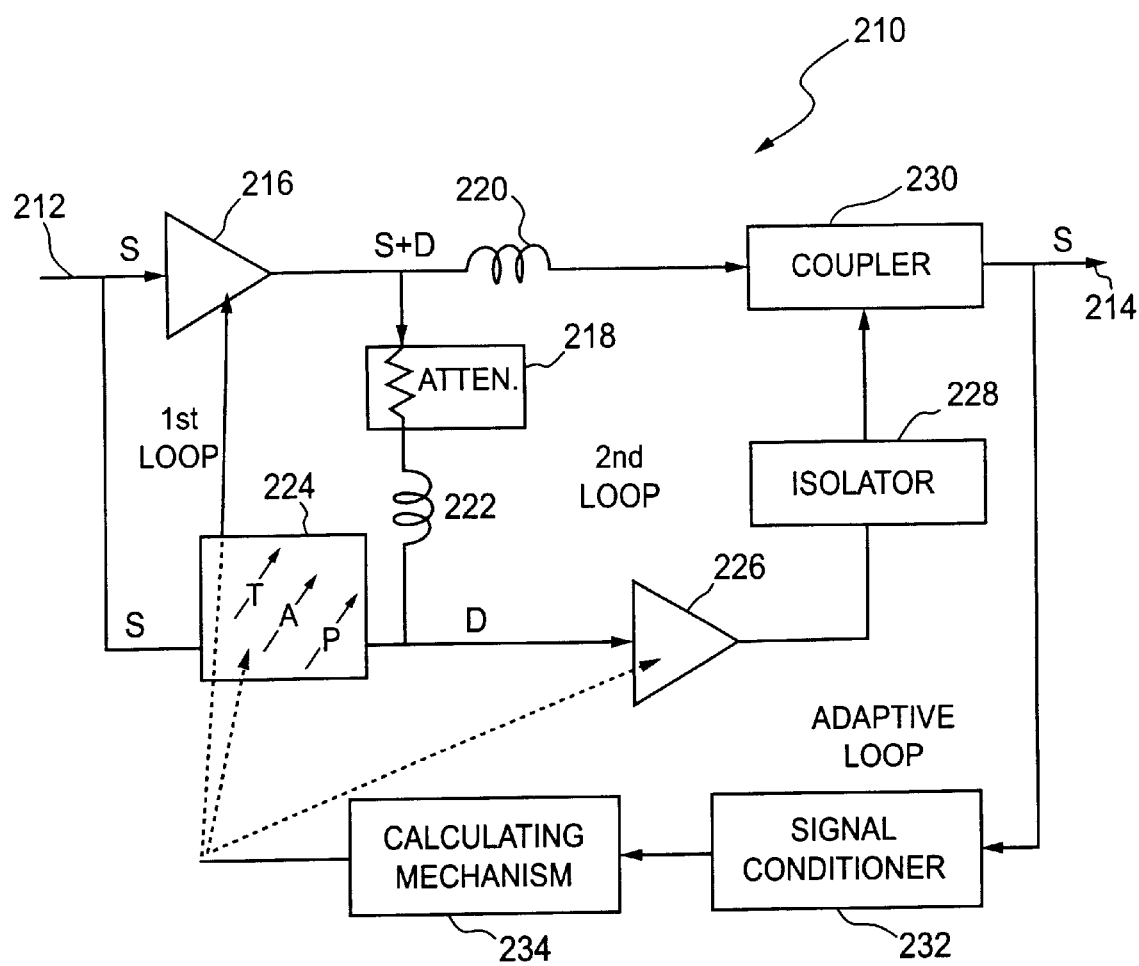
FIG. 15A is a schematic representation of an exemplary embodiment of a transmit linearized power amplifier.

FIG. 15A illustrates a schematic representation of an exemplary embodiment of a linearized power amplifier 210 which may form part of a given radiator subunit, for example, linearized power amplifier 152 of radiator subunit 142 shown in FIG. 11. The linearized power amplifier 210 shown in FIG. 15 comprises a first loop, a second loop, and an adaptive loop. The first loop comprises a signal cancellation loop, and the second loop comprises a distortion cancellation loop. The first loop provides cancellation of the main signals "S" supplied at an input 212. It strives to provide an accurate sample of the distortion "D" (intermodulation) to the second loop (i.e., the distortion cancellation loop). It comprises a first controllable amplifier 216 at an upper path and a variable signal conditioner comprising delay, phase and gain adjusters for the main signal at the lower path. More specifically, first loop comprises a first controllable amplifier 216 and a variable signal conditioner 224.

The second loop (the distortion cancellation loop) provides cancellation of the distortions generated by the first controllable amplifier 216. The second loop amplifies the distortion "D" supplied from the first loop and injects that amplified signal to the output line, via an isolator 228, at coupler 230, with proper amplitude and phase in order to cancel the distortion which is produced at output 214. The second loop comprises delay, phase and gain adjusters, and a second amplifier 226 which is provided at the lower path to provide for distortion cancellation. A fixed attenuator 218 is coupled between the output of first controllable amplifier 216 and the junction between the output of variable signal condition 224 and the input of second controllable amplifier 226. A fixed time delay element (comprising a section of wound coaxial cable in the illustrated embodiment) is placed between fixed attenuator 218 and the junction point between variable signal conditioner 224 and second controllable amplifier 226. A fixed time delay element 220 is placed between the output of first controllable amplifier 216 and an input of coupler 230.

An adaptive control loop is provided which comprises a signal conditioner 232 and a calculating mechanism 234. A pilot signal is employed to enable the determination of the degree of signal balance for the first loop and distortion balance for the second loop. Signal conditioner 232 includes a coherent power detector to provide an indication of the fundamental signal present at the output of the first loop. Signal conditioner 232 also includes coherent and non-coherent power detectors to provide an indication of distortion present at the output of the second loop. Calculating mechanism 234 facilitates the determination of optimal values for the variable elements in each loop, in order to help the obtaining of the required degree of cancellation. Accordingly, calculating mechanism 234 may comprise a mechanism for performing a gradient search algorithm for this purpose.

Figure 15B:
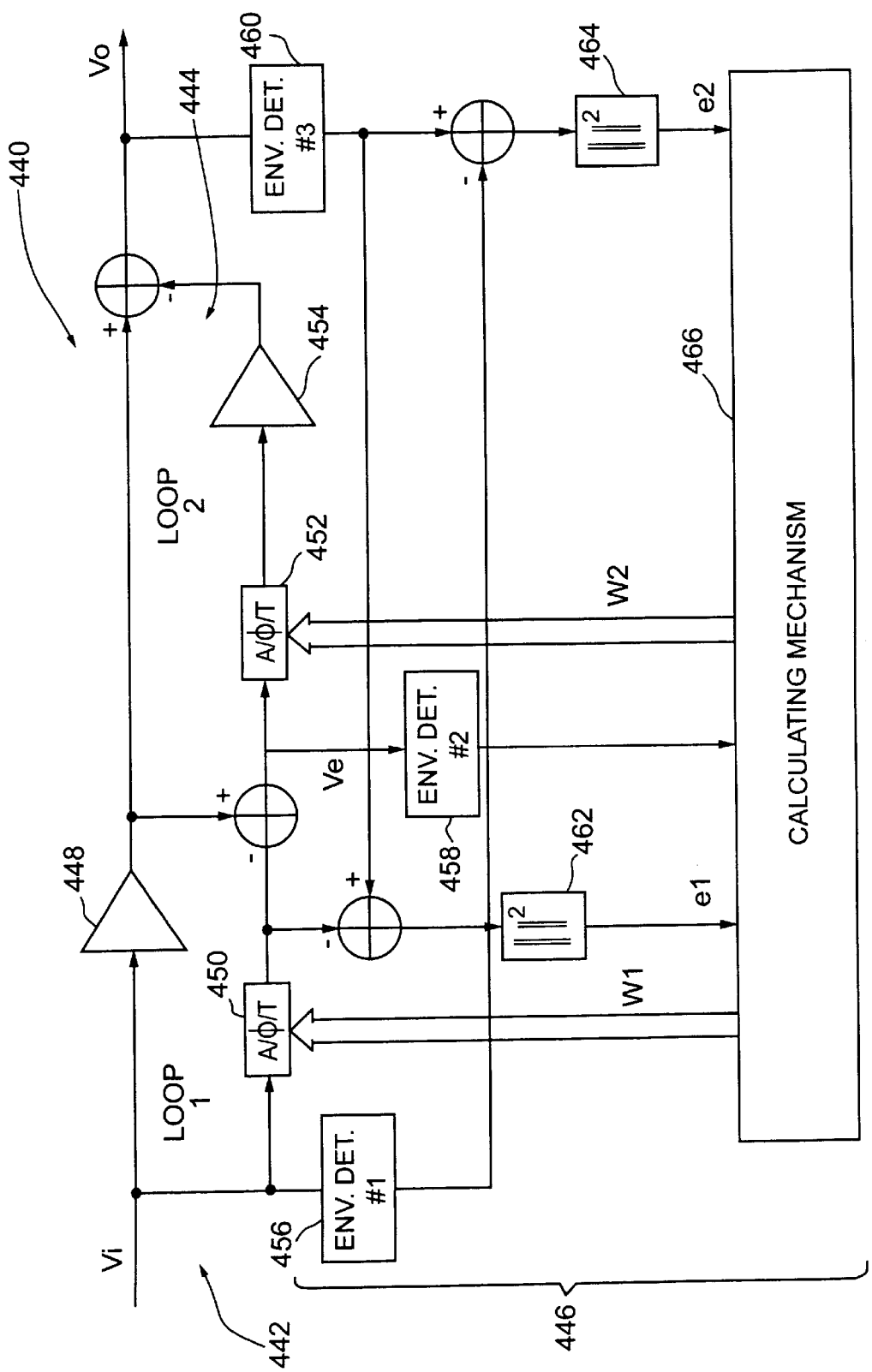
FIG. 15B is a schematic representation of another embodiment of a transmit linearized power amplifier.

FIG. 15B is a schematic of another example embodiment of a linearized power amplifier 440. The illustrated linearized power amplifier 440 comprises a first loop 442, a second loop 444, and an adaptive portion 446 which monitors various parts of the first and second loops as well as the output signal Vo and controls parts of the first and second loops. The input of the system is Vi, while its output is Vo.

As illustrated, first loop 442 comprises a power amplifier 448 and a first signal conditioner 450. Second loop 444 comprises a second signal conditioner 452 and an auxiliary amplifier 454. Three enveloped detectors are provided, including an envelope detector #1 456, an envelope detector #2 458, and envelope detector #3 460. First and second calculators 462 and 464 are provided. In addition, a calculating mechanism 466 is provided. Calculating mechanism 466 obtains input information from first calculator 462 and second calculator 464 and also from envelope detector #2 458. Calculating mechanism 466 provides control signals to control each of first signal conditioner 450 and second signal conditioner 452.

The goal of the circuit is to minimize the presence of intermodulation products at the output. The second loop's amplitude (A), phase (Ø) and delay (T) are controlled. In addition, the difference between mean power of the signal at the system's output and the mean power of the input signal are both minimized while the first loop provides for cancellation of the main signal.

The main signal is cancelled by controlling the amplitude, phase and delay of the first loop according to the mean power level measured at the loop's output by envelope detector #2.

Assumptions are made that the intermodulations and the fundamental signal are not correlated, and that the subtraction of the input signal power from the output signal power provides the intermodulation power.

The envelopes of the input and output signals are respectively detected by envelope detectors #1 and #3. The outputs of the detectors are sampled by the control system for processing. The processing includes calculating the mean power of the input and output signals, calculating the intermodulation power, and minimizing the intermodulation power. This is done by using the known LMS algorithm.

$$e1 = \|Vo - W1Vi\|^2$$

$$e2 = \|Vo - Vi\|^2$$

W1 is the control for first signal conditioner 450 of loop 1.

W2 is the control for second signal conditioner 452 of loop 2.

The proposed adaptation method forces the control signals W1 and W2 to obtain minimization of the of some linear combination of signals e1 and e2. The minimization process is based on the perturbations method.

Minimization of e1 and e2 enables minimization of the intermodulations.

IV. The Filter Structure

Figure 16A:
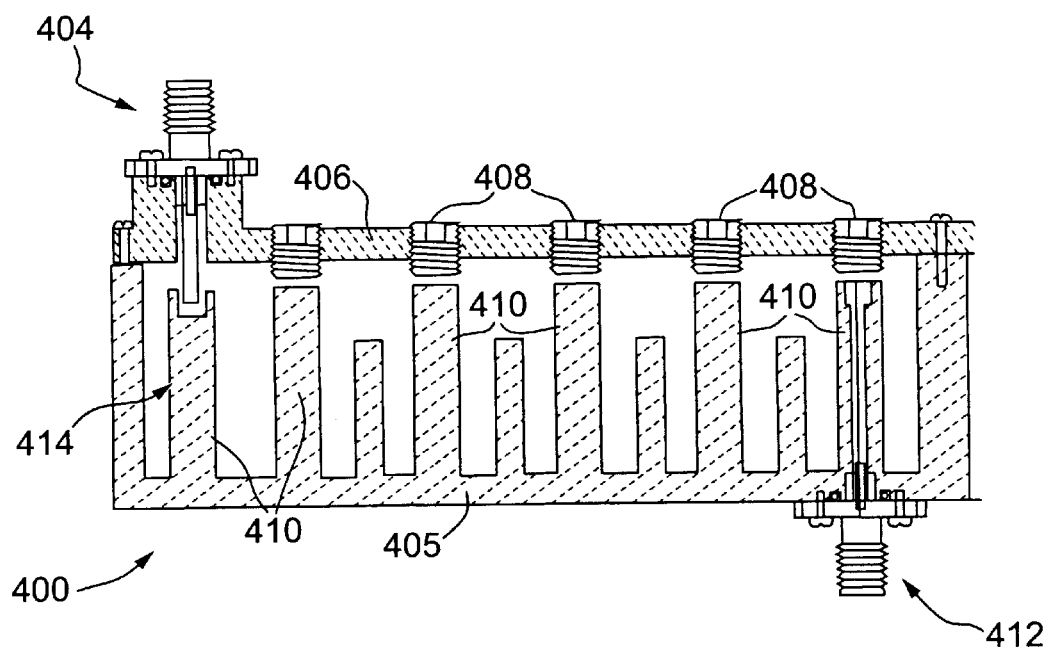
FIG. 16A shows a cross-sectional side view of a filter structure.
Figure 16B:
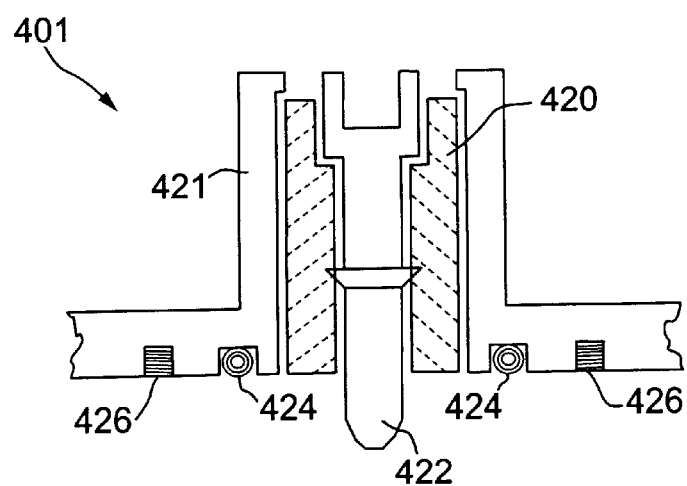
FIG. 16B shows a side view of a capacitive coupling connection of the filter shown in FIG. 16A.

FIGS. 16A and 16B respectively illustrate an exemplary filter structure 400 and a capacitive coupling connection 401. Filter 400 represents a structure for both transmission and receive band pass filters in the exemplary embodiments disclosed herein. Of course, this is one illustrative example and does not preclude other types of band pass filters from being provided. Accordingly, each of the transmit and received band pass filters described herein may be implemented, generally, as shown in FIGS. 16A and 16B. In the embodiment illustrated, filter 400 comprises 6 coaxial combline resonators 410. The illustrated structure is elliptic. Filter 400 comprises a housing made of aluminum. The housing may form an integral part of an aluminum module housing structure as shown, for example, in FIGS. 7–8, and/or 9. By providing the same housing structure for both the transmit and receive filters, production and cost benefits can be achieved.

The illustrated filter 400 comprises an antenna side connector 404 and an amplifier side connector 412. These connectors may be connected directly to the antenna element (or, as appropriate, a combiner/splitter) and to the amplifier, respectively. Both of these connections may be provided with an optional connector attachment to enable pre-integration tuning capability.

By providing the antenna side and amplifier side connectors on opposite sides of filter 400, the filters may be more easily integrated into a filter portion of a given module block (e.g., transmission block 110 as shown in FIG. 8). The illustrated structure comprises a housing 405 and a cover 406. The cover 406 faces the antennas. Antenna-side connector 404 is coupled to cover 406, and amplifier side connector 412 is coupled to the bottom of filter 410. Accordingly, the structure of the filter is changed from comb-line to inter-digital. An inter-digital transition 414 is shown in FIG. 16A.

An issue encountered when integrating the filters into an ARU module involves the interconnections intermodulation caused by corroded RF contacts. This phenomenon may be attributed to bi-metal corrosion. In order to overcome this problem, connections to the filter housing 405 are accomplished by coupling, without galvanic connections. Moreover, since the illustrative filter housing 405 is die-casted, no soldering is possible for connecting items to an integral part of the filter. An illustrative capacitive coupling connection 401, which may be utilized for both the antenna side connector 404 and the amplifier side connector 412, is shown in FIG. 16B. This illustrative capacitive coupling connection 401 helps address the issue noted above. Each capacitive coupling connection 401 comprises, among other elements, a teflon sleeve 420, which is cylindrical and is inserted into a cylindrical portion 421. A conductive seal 424 provided at the surface. In the illustrated embodiment, conductive seal 424 comprises a conductive O-ring. Threaded bores 426 are provided for receiving bolts or screws, which allow the connection of a connector to the coupling connection.

V. Network Infrastructure, Power, Coordination and Control

Figure 17:
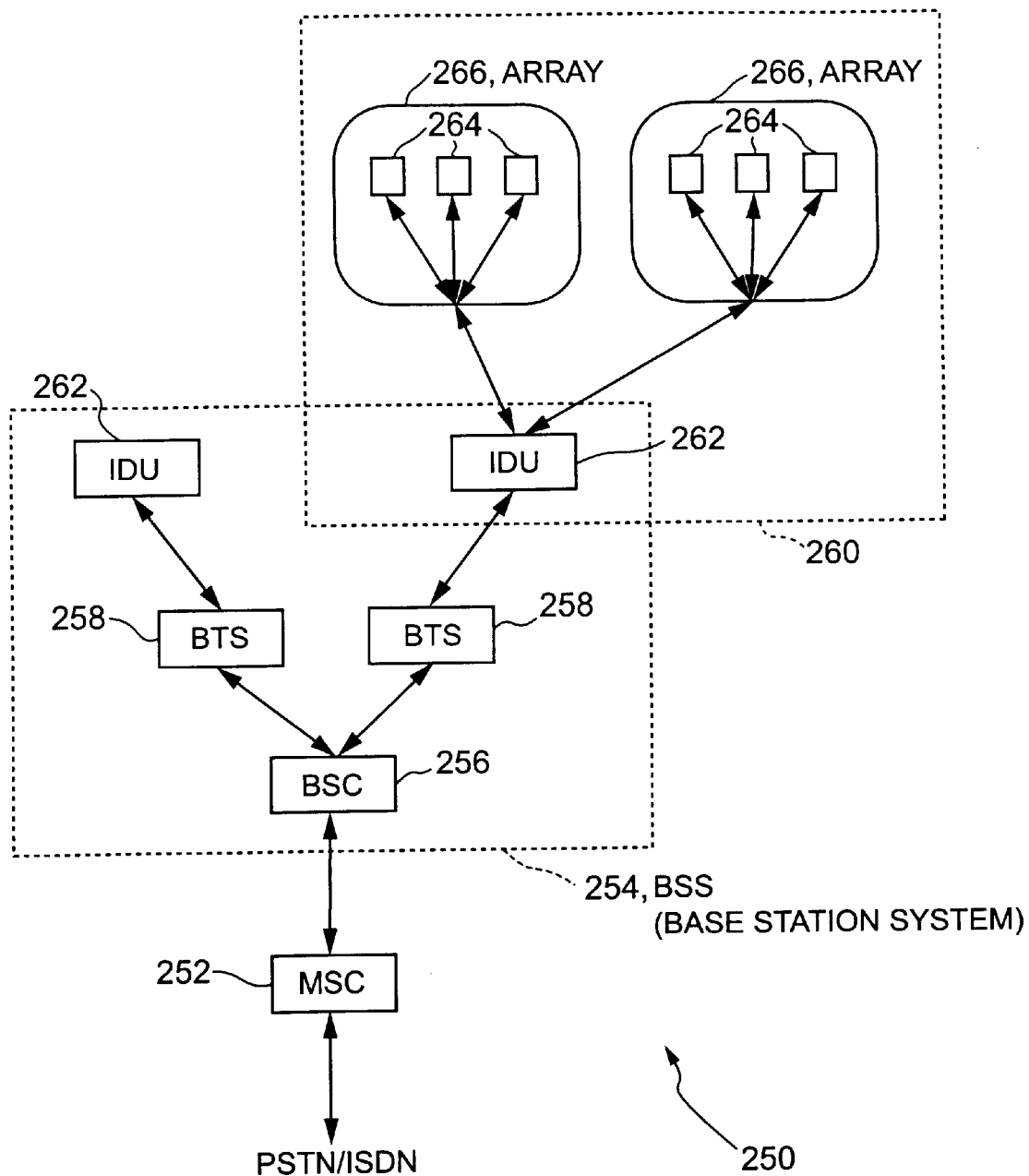
FIG. 17 is an overview block diagram of a cellular communications network.

FIG. 17 is a high level block diagram illustrating a cellular telecommunications network 250. Network 250 includes several telecommunication layers. The first layer, a mobile switching sensor (MSC) 252 comprises an interface between the cellular system and other telecommunication networks, such as a public switched telephone network (PSTN) and/or an integrated services digital network (ISDN). Each MSC 252 may serve several base station systems (BSSs) 254. In certain systems, such as GSM or PCS, BSS 254 may be further divided into a base station controller (BSC) 256 that serves several base transceiver stations (BTSs) 258.

Base transceiver stations 258 receive and transmit information through an antenna arrangement located at a given localized site 260, which may comprise a support structure, mast, tower, or building. An indoor control unit (IDU) 262 is provided at each localized site 260, and interfaces antenna arrangements with base transceiver stations 258. In the illustrated example, the antenna arrangements comprise arrays 266 of active radiator units (ARUs) 264. The IDUs 262 control and provide the ARUs 264 with DC power. The IDUs 262 perform other functions as well, such as described above and further below. ARUs 264 are arranged into groupings shown as arrays 266, where an array can contain from 1 to N ARUs (N being an integer). The connection between each array 266 and its ARUs 264 may be established, e.g., with one or more coaxial cables. Fiber optic links or shared coaxial TV (CATV) cables may be used.

Figure 18:
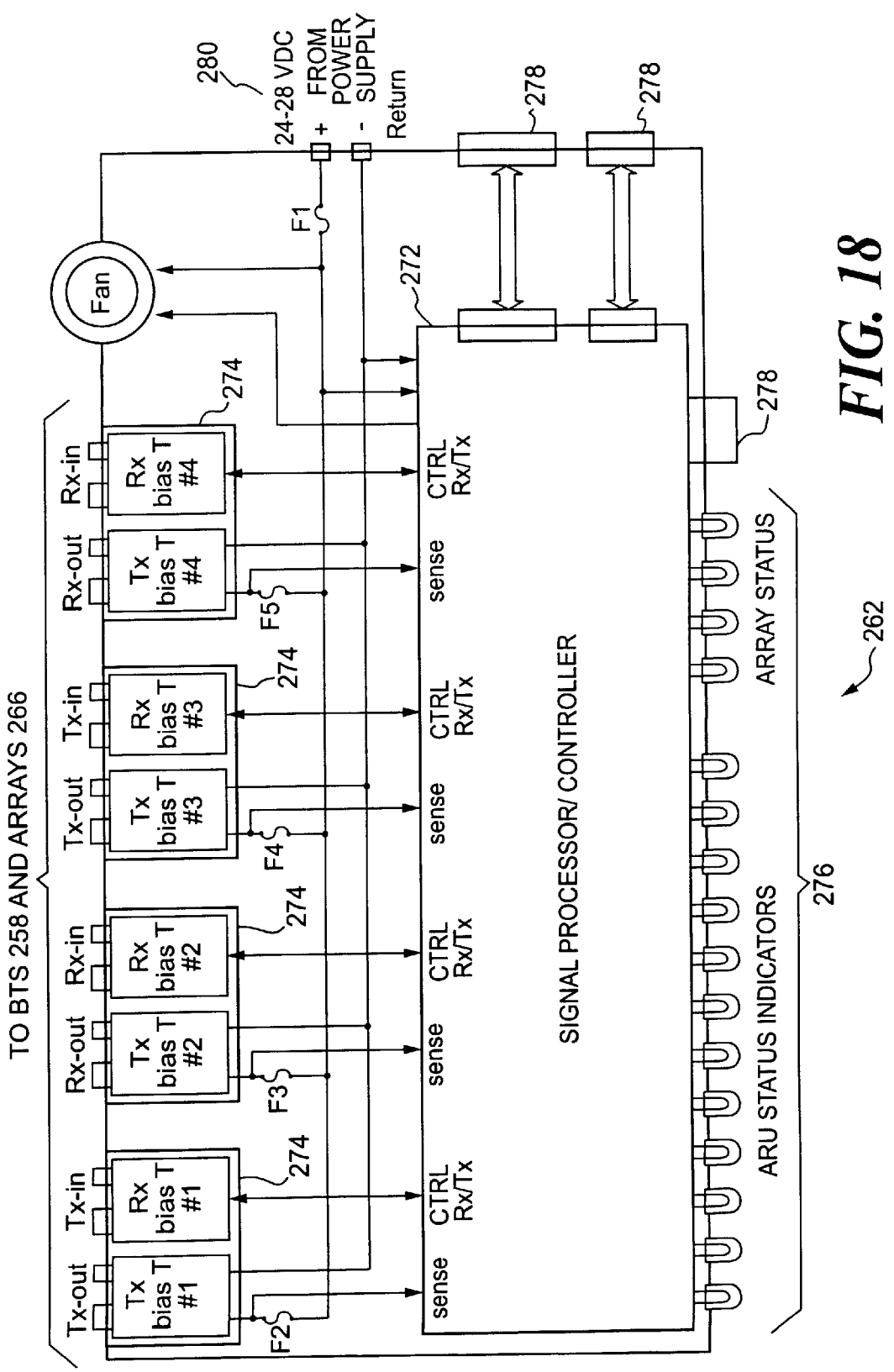
FIG. 18 is a more detailed schematic diagram of the illustrated IDU.

FIG. 18 is a block diagram of an illustrative IDU 262. IDU 262 includes a signal processor/controller 272, which controls a plurality of bias T-connection units 274. T-connection units 274 connect the IDU to arrays 266 and BTSs 258. LED indicator lights 276 visually report the status of ARUs 264 and arrays 266. Serial ports 278 connect IDU 262 to external circuitry, such as a computer. Power ports 280 supply power to IDU 262. Bias T-connection units 274, under the control of controller 272, couple the arrays 266 with BTS 258. More particularly, bias T-connection units 274 supply arrays 266 with RF Tx signals and DC power by multiplexing the combined signal over a single coaxial RF cable. Use of a single coaxial cable with a combined signal decreases the overhead and connection wiring that would otherwise be required. The multiplexing of data and DC power is described in more detail below.

In addition to the DC power and RF Tx signal, bias T-connection units 274 communicate control information bi-directionally with ARUs 264. Communication with the ARU 264 may be established through an FSK-modulated communication channel supplied on one of the coaxial cables connecting ARU 264 to IDU 262.

Figure 19:
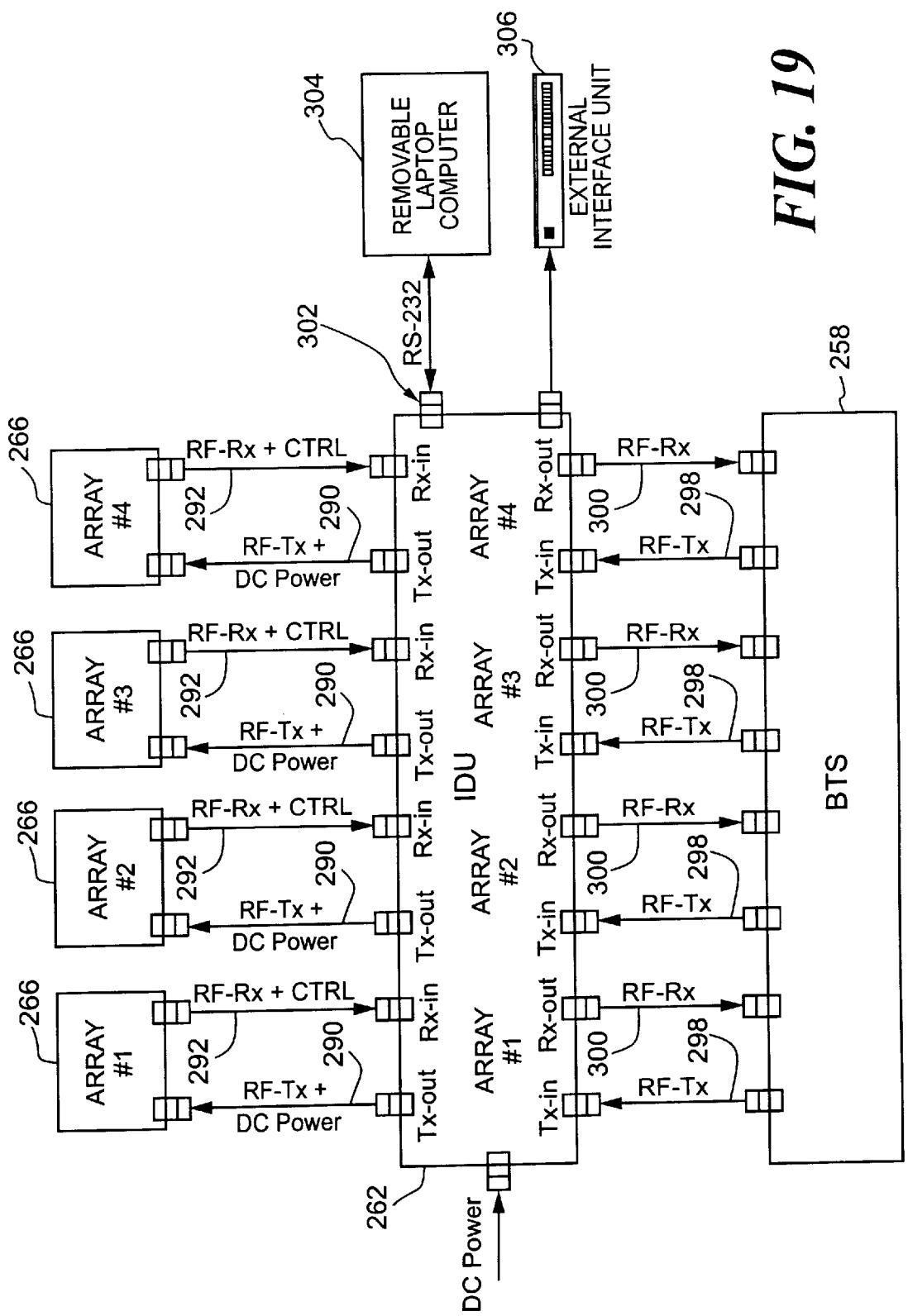
FIG. 19 is a high-level diagram illustrating a portion of a communication network comprising a plurality of arrays coupled to one common IDU and one common BTS.

FIG. 19 is a diagram illustrating exemplary system level interconnections of an IDU 262 to arrays 266 and BTS 258. IDU 262 receives an RF signal from BTS 296 via coaxial cables 298 and forwards it, along with the DC power, to arrays 266 via coaxial cables 290. Conversely, IDU 262 may receive RF signal and control information from arrays 266 via cables 292 and forward the RF signal to BTS 296 via cables 300.

Computer 304 and external interface unit 306 are connected to IDU 262. In general, these two elements may provide diagnostic information, configuration, and remote control abilities to IDU 262. An on-site technician may plug in a laptop computer 304 (or another type of computer or control device; alternatively, a portion may be provided as part of IDU 262) to monitor and to control arrays 266 or ARUs 264. For example, a laptop computer 304 may be used to input information to IDU 262 relating to local network topology, such as the number of arrays 266.

External interface unit 306 couples IDU 262 to the external network. Through the network, technicians in a central network control center may receive status information from IDU 262 and ARUs 264, and transmit commands to IDU 262 and ARUs 264. External interface unit 306 may itself contain sensors, such as temperature sensors, or receive sensor information from additional sensors external to IDU 262.

Bias T-elements 274 of IDU 262 control the gain of the RF signals going to arrays 264 or BTSs. Additionally, as discussed previously, bias T-elements 274 multiplex DC power and control information with RF signals going to arrays 266. A more detailed description of the Tx (transmission) bias-T circuits 321 and the Rx (reception) bias-T circuits 322 will now be described with reference to FIGS. 20A and 20B.

Figure 20A:
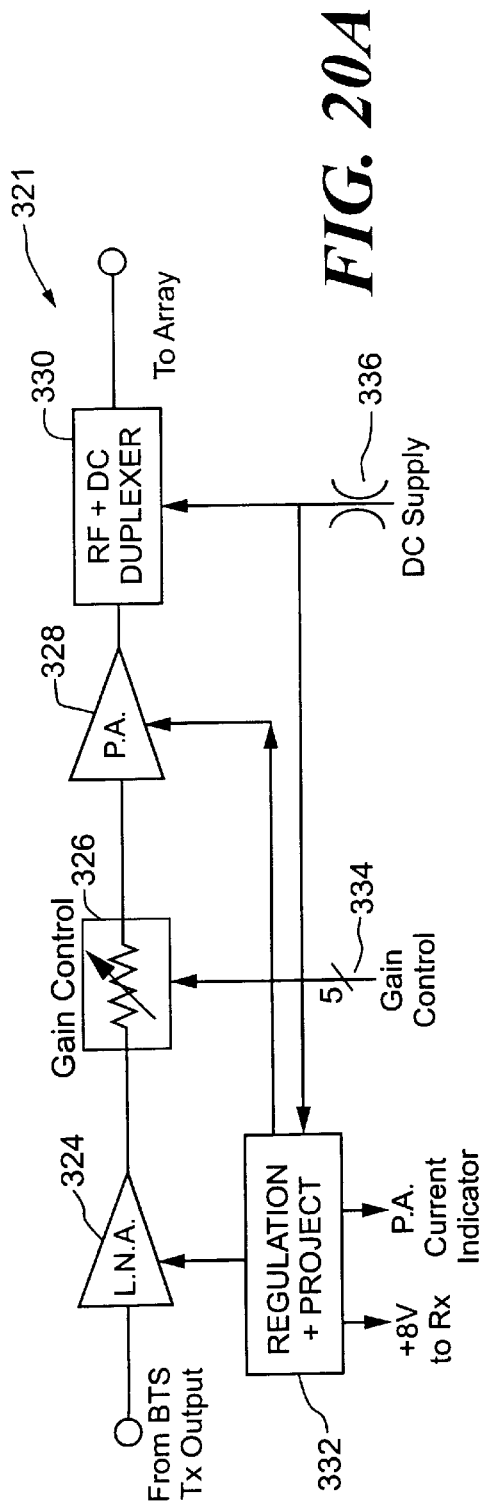
FIG. 20A is a schematic diagram of a transmit active bias-T circuit.

FIG. 20A is an exemplary circuit diagram of a Tx bias-T circuit 321. RF signals received from BTS 258 are passed through a low noise amplifier (LNA) 324 and then amplified or attenuated by a gain control circuit 326. The degree of gain used by gain control circuit 326 is set by control lines 334 emanating from signal processor/controller 272. The resultant signal is then passed through a power amplifier (PA) 328 before it is finally combined, via duplexer 330, with the DC power signal from DC supply 336. A regulator 332 regulates the DC power supply to the LNA 324 and PA 328.

Figure 20B:
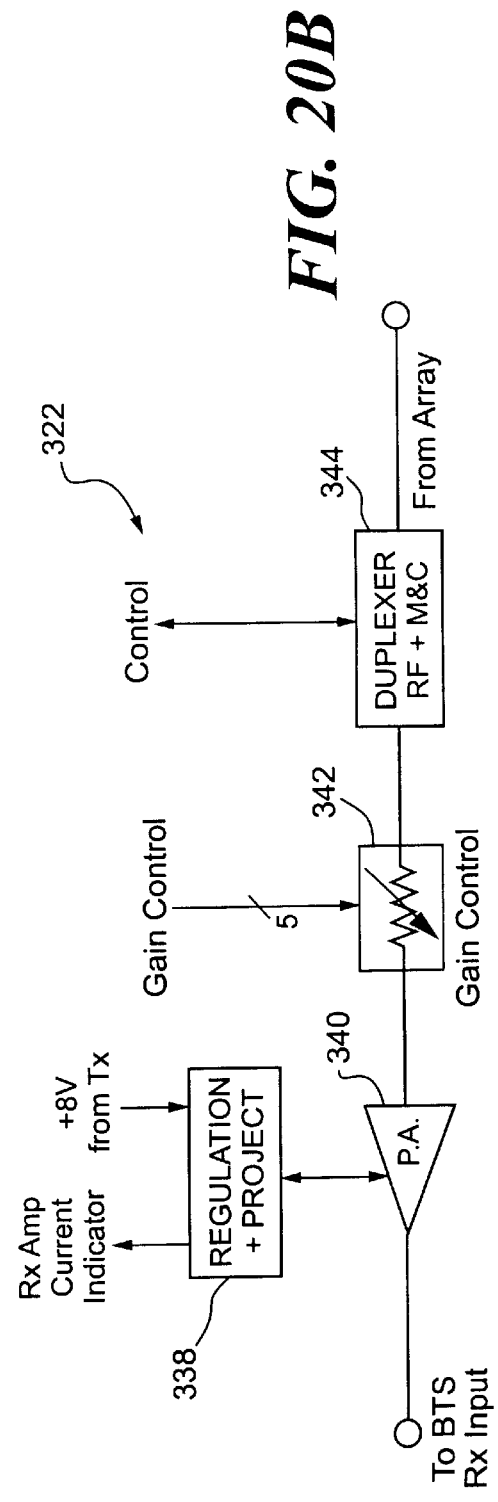
FIG. 20B is a schematic diagram of a receive active bias-T circuit.

FIG. 20B is a circuit diagram of an Rx bias-T circuit 322. RF signals received from arrays 266 contain control information related to the operation of arrays 266 and RF signals being transmitted over the telecommunications network. A duplexer 344 is provided which separates the combined received signal into its constituent control information and RF signals. The control information is transmitted to controller 272 for processing. The RF signals are amplified or attenuated by a gain control circuit 342 under the direction from signal processor/controller 272. The amplified signal is then passed through power amplifier 340 and then transmitted to BTS 258. Regulator 338 regulates the DC power supply to power amplifier (PA) 340.

As described above, control and status information is exchanged between ARUs 264 and the IDU 262. The status information may include information such as the temperature or output power at various points in the system. Output power information relating to ARUs 264 and amplifiers 328 and 340 of the IDU, in particular, may be used to adjust the gain at IDU 262 and ARUs 264. For example, a technician may monitor the power outputs at a particular ARU 264 and adjust the power amplification levels of amplifier 328 and/or amplifiers in the ARUs 264. Alternatively, a technician may monitor signal power entering the T-bias circuits from the ARUs 264, and accordingly adjust the amplification levels of the PA 328 and/or amplifiers in the ARU 264. These steps may be performed by the technician either locally through laptop computer 304 or remotely through external interface unit 306.

VI. Other Radiator System Arrangements

Figure 21:
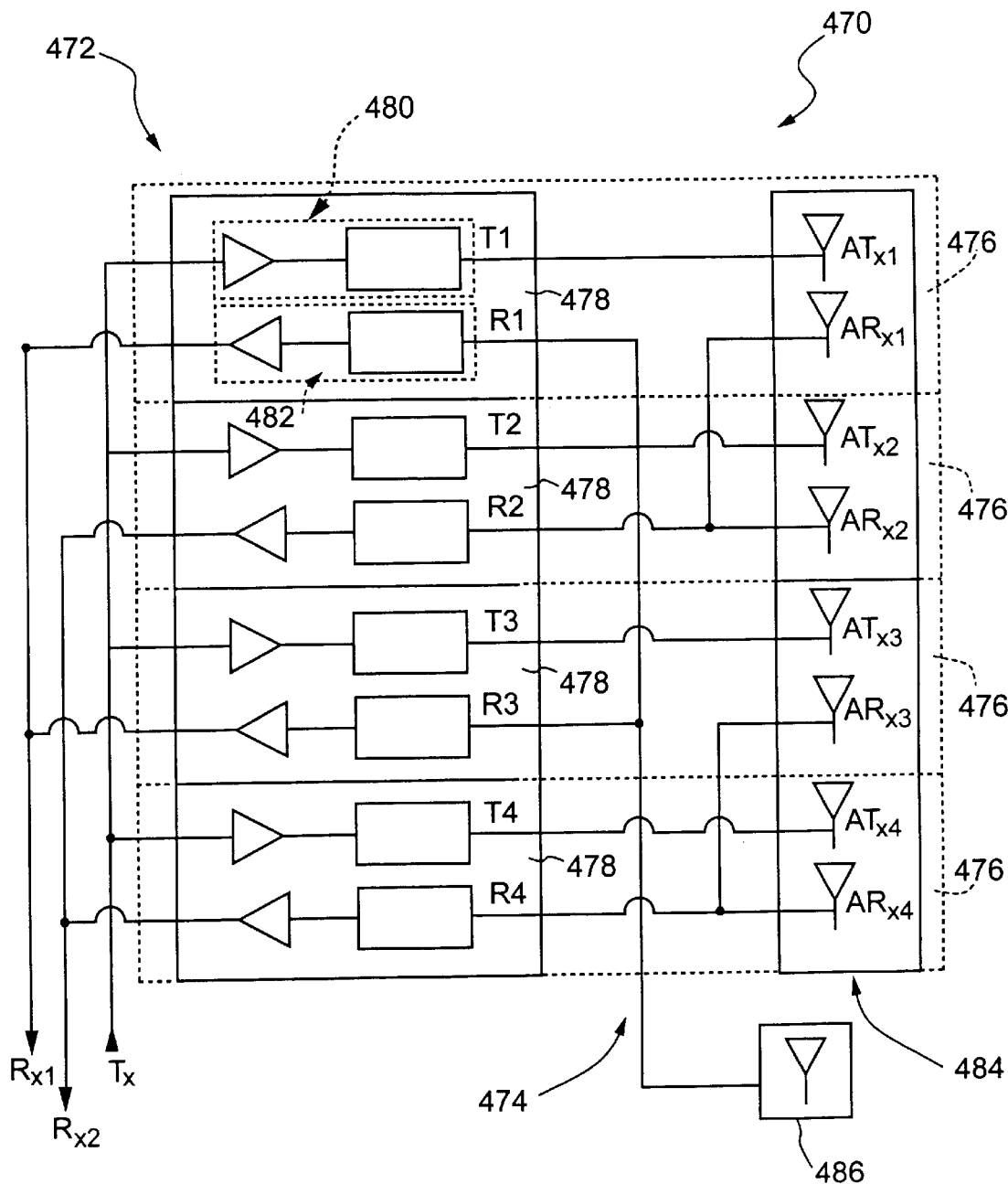
FIG. 21 shows a specific embodiment of an arrangement of ARUs comprising a structure for accommodating a space diversity antenna connection.

FIG. 21 shows a specific embodiment of an arrangement of ARUs comprising a structure for accommodating a space diversity antenna connection. The illustrated arrangement 470 comprises a plurality of ARUs 476. Specifically, for ARUs 476 are provided. Each ARU comprises an active radiator sub-unit 478. Each active radiator sub-unit 478 comprises a modular structure, for example, as shown in FIG. 7, and contain both a transmit path portion 480 and a receive path portion 482. A first combiner/splitter feed 472 is provided at one side of the arrangement (the BTS side), and a second combiner/splitter feed 474 is provided at the other side of the arrangement (the antenna side). The connected antenna elements comprise a local columnar array 484 and a spaced antenna arrangement 486, which may comprise one or more antenna elements positioned at a predetermined location at a predetermined distance from local columnar array 484 (e.g., ten wavelengths away).

Each of the transmit path portions T1, T2, T3, and T4 is respectfully connected to antenna elements ATx1, ATx2, ATx3, and ATx4. A first sub-set of the receive path portions (two in the illustrated embodiment) R1 and R3 (alternating) have their outputs connected in common to receive port Rx1 and their inputs connected in common to spaced antenna arrangement 486. An interleaved different set (two in the illustrated embodiment) of receive path portions R2 and R4 connected between local receive antenna elements and the second receive port Rx2. Specifically, there outputs are connected in common to the receive port Rx2, while the input of the first receive path portion R2 is connected, in common, to both of receive antenna elements ARx1 and ARx2, and the input of receive path portion R4 is connected to both receive antenna elements ARx3 and ARx4.

The space diversity provided by this embodiment, or variations thereof, significantly helps mitigate multipath fading on the incoming (reverse link) channel. Diversity is achieved by providing two or more receive paths, the fading at which are not timed-correlated. The two sets of antennas preferably have the same coverage (e.g., a given sector) and SNR (signal to noise ratio). The spacing between the respective antenna sets is typically ten wavelengths or more.

The arrangement 470 shown in FIG. 21 provides amplification to both outgoing signals and to received signals. It may be configured to correspond to a given sector, and provide one transmit channel and one receive channel. The spaced antenna arrangement 46 provides for space diversity. Additional amplification is provided for the diversity antenna (spaced antenna arrangement 46) in order to provide an equal SNR to that of the main receive path. By providing the low noise amplifiers for both the local and spaced receive path portions at one central location, which is centrally controlled SNR balancing may be more easily handled. In addition, gain control of the unified system can be facilitated by a monitoring and control sub-system for controlling each of the radiator sub-units 478 of the arrangement. In addition, the illustrated embodiment shown in FIG. 21 provides for substantial redundancy, providing a plurality of transmit and receive antenna elements, and separate transmit and receive path portions. Accordingly, if one of those antenna elements or receive and/or transmit path portions becomes inoperable, the remaining elements will continue to provide functionality and continued coverage.

In sum, the advantages provided by an arrangement such as that shown in FIG. 21 include low noise amplification features (including NF, gain, linearity, and dynamic range) which are the same for both of the diversity branches; all ARUs may be controlled by a single control system (e.g., which the use of the IDU) which provides for comprehensive monitoring and control of both of the diversity branches; there is no requirement for additional costs needed to provide separate low noise amplifiers for the spaced antenna arrangement; and standard uniform modular active radiator sub-units 478 may be used which facilitate change modification and scalability of the system.

Figure 22A:
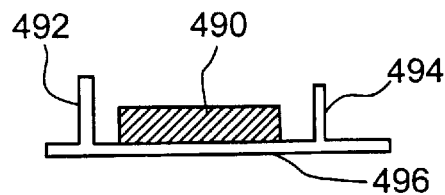
FIGS. 22A and 22B respectively show top and side views of a given columnar array of antenna elements comprising one embodiment of an end fire suppression structure.
Figure 22B:
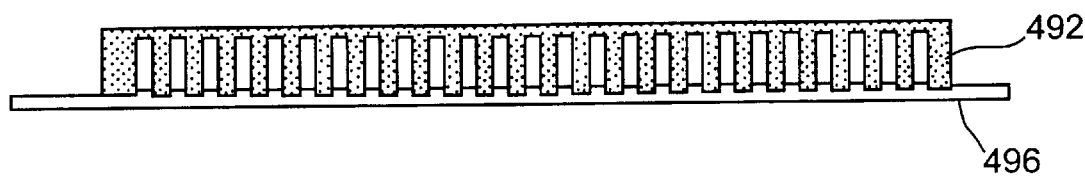

FIGS. 22A and 22B respectively show top and side views of a given columnar array of antenna elements comprising one embodiment of an end-fire suppression structure. A columnar array of antenna elements is provided (not shown in FIGS. 22A–22B) underneath a radome 490. End-fire suppression structures 492 and 494 are provided above and below, respectively, radome 490. Radome 490 is provided at the face of the antenna arrangement. Upper end-fire suppression structure 492 is coupled to a support structure 496, to which the antenna arrangement is mounted, including radome 490. In addition, lower end-fire support structure 494 is also mounted to support structure 496. Each of upper and lower-end fire support structures 492, 496 extends outwardly past the face of radome 490.

FIG. 22B provides a top view of the arrangement illustrated in FIG. 22A, and thus shows upper end-fire support structure 492 coupled to support structure 496. In the illustrated embodiment, the configuration of upper and lower end-fire support structures 492 and 494 is substantially identical. Thus, a bottom view of the arrangement illustrated in FIG. 22A will be substantially the same as the view shown in FIG. 22B.

As shown, upper end-fire suppression structure 492 comprises a conductive plate member with a plurality of perforations which are orthogonal to the longitudinal direction of the plate member, which corresponds to the up and down direction as shown in FIG. 22B. More specifically, in the illustrated embodiment, a plurality of rectangular-shaped perforations are arranged from one end to the other of lower end-fire suppression structure 492. End-fire suppression structure 492 may be formed, for example, of a conductive metal material.

Figure 23:
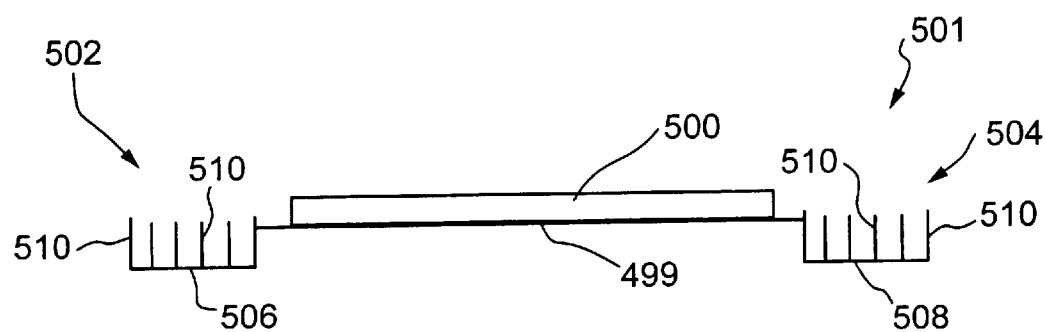
FIG. 23 shows a side view of a columnar array of antenna elements comprising another embodiment of an end fire suppression structure.

FIG. 23 shows a side view of an antenna arrangement 501 comprising a radome 500. An upper end-fire suppression structure 502 is coupled to a top end of the antenna arrangement which extends beyond the top end of radome 50. A lower end-fire suppression structure 504 is coupled to a bottom end of the antenna arrangement 501 which extends beyond the bottom end of radome 500. Each of upper and lower end-fire support structures 502 and 504 comprises recessed support members 506 and 508 structurally supported by a support structure 499 to which radome 500 is connected. Support members 506 and 508 are recessed and thus behind radome 500 by a predetermined distance. That distance corresponds to the amount of depth of the chokes 510. Each of the end-fire suppression structures 502 and 504 comprises a plurality of chokes which are in the form of plate-shaped metallic/conductive members aligned with a plane orthogonal to the main plane of radome 500. Chokes 510 are arranged at spatial intervals running along the longitudinal direction of antenna arrangement 501, and each comprises a depth (from its top/end down to its bottom edge which is in contact support member 506, 508) which is designed in order to control the impedance of the chokes.

The end-fire suppression structures illustrated in FIGS. 22A–22B and 23 are provided to facilitate the suppression of end-fire effects in an antenna array. An antenna array may generate grating lobes when its elements are spaced close to one wavelength, or when the elements are phased for scanning beyond a certain squint. Grating lobes that appear in the visible space may radiate a substantial fraction of the power, thus reducing the gain, and may cause an unwanted radiation or sensitivity of the array. The embodiments illustrated in FIGS. 22A–22B and 23 provide structures to mitigate such grating lobes. Specifically, choke beds are provided to divert the end-fire grating lobe.

End-fire radiation may provide significant disadvantages in applications such as cellular and PCS. For example, it may be desirable to space elements close to one wavelength apart, and/or to tilt a beam electrically. In order to suppress end-fire radiation, a number of features may be provided. For example, the element pattern may be shaped so as to be directional enough in the array plane, to suppress the end-fire radiation to a desired level. This solution is limited by the sides of the unit cell (less than one wavelength) and by other requirements from the array (e.g., isolation between the elements). Some arrays may have reactive elements within each unit (which may comprise an ARU or a radiator unit). A unit may have both transmit and receive elements, each of which is backed by a filter that is at a stop band of the other element. Such reactive elements may be tuned to suppress the end-fire to a certain extent. However, this effects the main lobes and the side lobes at the same time. The reactive elements may be tuned to become a director or a reflector to the active element, thus, countering the end-fire effects in the opposite direction. However, the level of excitation of the reactive element has to be high enough to be effective, which influences the main performance of the array.

The present embodiments take into account certain characteristics of end-fire, including that end-fire effects are supported by a light evanescent wave. Accordingly, a conductive structure may be provided which protrudes from the array surface to over a quarter of a wavelength or so in front of the array surface. This conductive structure, which may be made of metallic material, will interact with the wave caused by end-fire effects. A reflector may be provided, which is tilted at 45°, to divert to the broad side a substantial portion of the energy. Note that vertical protrusion is by far less productive, as it supports a standing wave along the array and only an edge defraction to other directions.

Choke beds may be provided such as those shown in FIG. 23, where chokes are provided which extend toward the back of the antenna surface. The chokes provide an impedance mismatch to the end-fire wave, mainly by the mismatch in the phase of velocity. The bed of chokes must extend over a predetermined length above and below the radome in order to be effective. A length extending above and below the radome of a quarter of a wavelength will provide a discernible effect. The depth of each choke has an effect on their impedance. The chokes also support standing waves and effect the visible side lobes. Fine tuning may be employed to balance between end-fire suppression and the affects in the visible range.

VII. Delay Shifters and the LPA

In accordance with a particular embodiment, the linearized power amplifier may comprise a dynamic delay compensation mechanism. Such a mechanism uses delay shifters in the amplifier loops to facilitate the effective cancellation of distortion products over a wide bandwidth.

In the linearized power amplifiers disclosed, e.g., in FIGS. 15A and 15B, the cancellation of unwanted signals in each loop is frequency dependent due to a time delay mismatch between the upper and lower paths. Fixed delay lines may be used to roughly compensate for these delay mismatches; however, such fixed delay lines cannot fully compensate delays varying over time due to environmental variation and aging of components. A dynamic delay compensation mechanism may be provided to accommodate such varying delays. Specifically, a controllable delay shifter (CDS) may be provided which is controllable by a control system and enables the compensation of the delay variations and therefore allows for the wide band instantaneous bandwidth of the Linearized Amplifier. Such a CDS may be provided in each of the loops of a linearized amplifier so that they can be automatically compensated for delay differences.

Figure 29:
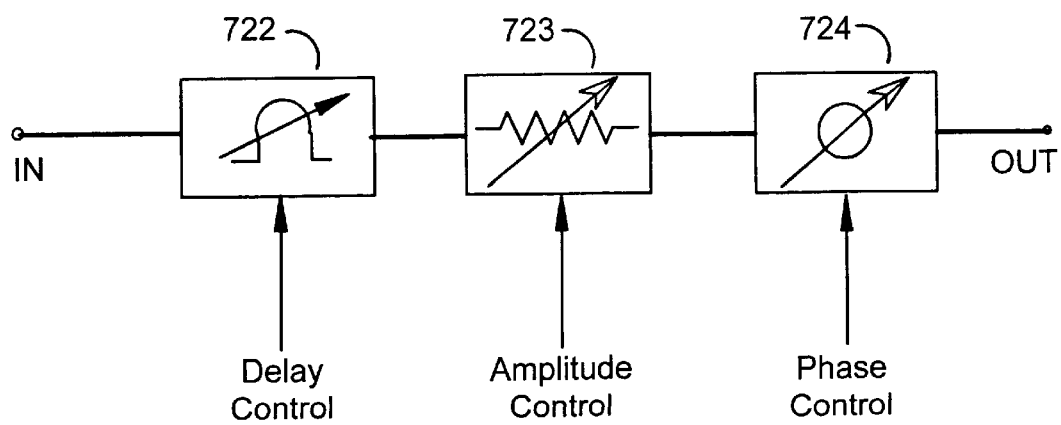
FIG. 29 is a diagram of a tuning apparatus.

FIG. 29 represents a block diagram of one embodiment of a dynamic controllable delay shifter. The illustrated CDS comprises a transmission line 706 in between the IN port and the OUT port. The transmission line is loaded by shunt inductors 707, 708 and shunt variable capacitors 709, 710 and serves as a loaded line. Unlike existing loaded line phase shifters which comprise the line loading elements with almost equal reactance with opposite signs, the capacitive loading elements 709, 710 have a much lower reactance than the inductive loading elements 707, 708. Thus the capacitive loading elements have a more pronounced effect on the transmission phase of the circuit of FIG. 29. Inductive loading elements 707, 708 tune out the effect of the residual capacitance of the capacitive loading elements 709, 710 at their minimum capacitance setting.

Figure 30:
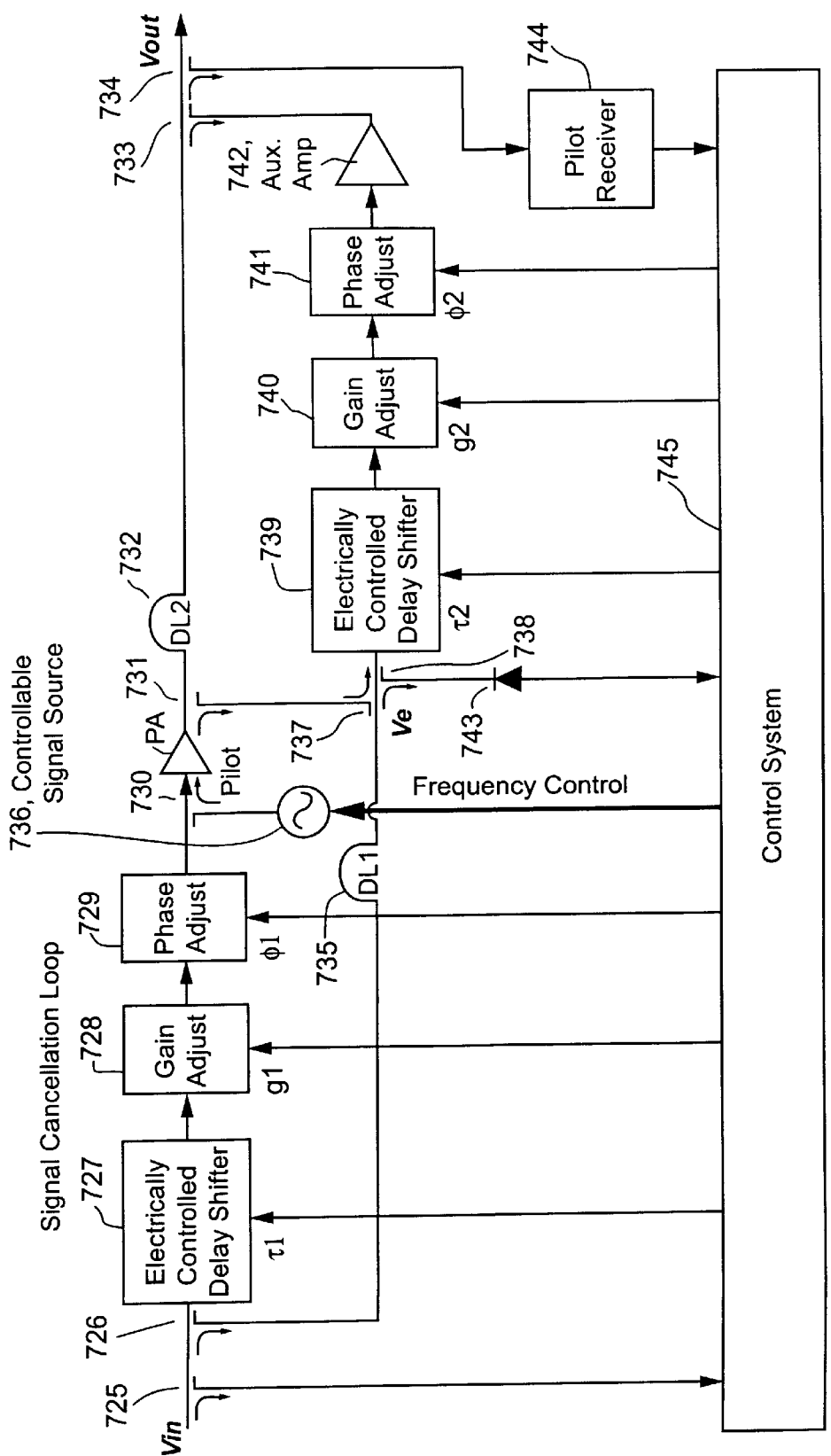
FIG. 30 is a diagram of an example LPA incorporating CDSs.

FIG. 30 represents the transmission phase versus frequency behavior of the circuit presented on FIG. 29. Curve No. 1 represents the transmission phase of a regular transmission line. The phase is 0 at 0 frequency and it has the form of a straight line with a certain slope with frequency. The slope of this line is defined as the delay of that transmission line which can be represented by the following equation:

$$T = d\phi/dw$$

When a capacitive loading of the transmission line is connected as in FIG. 29, the phase-over-frequency behavior will take the form of curve No.2 of FIG. 30. The exact form (such as steepness and values) is a function of frequency and the capacitive loading 709, 710. Over a certain usable Bandwidth 3, the average slope of curve 2 is higher than the curve 701 of the original transmission line 701 and thus one can get a change in the transmission delay of the structure over a certain bandwidth. The absolute transmission phase is changed in parallel to the shift in the transmission delay, and thus would also benefit by being compensated for by a phase shifter.

Figure 31:
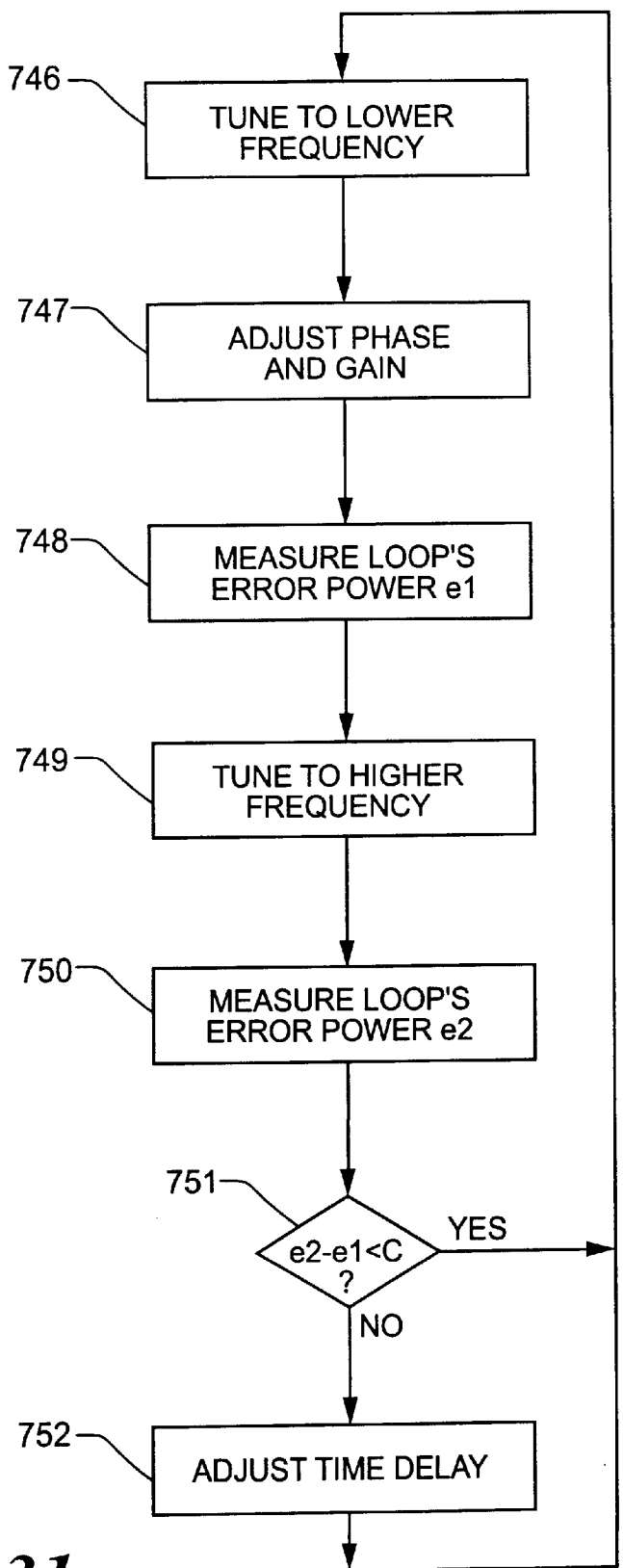
FIG. 31 is a flow chart of a pilot frequency tuning process.

Another embodiment of a DSL is shown in FIG. 31. The electrically changeable capacitors loading the transmission line 715, are implemented by dual back-to-back varactor diodes 716, 717 and tuning inductors 713, 714. These varactor diode pairs are connected in a back-to-back configuration in order to have the non-linearity inter-modulation products created within each varactor diode to cancel with each other. The cancellation of the IM products is due to the opposite polarity connection of each varactor diode pair.

The biasing network is comprising RF chokes 718, 719, RF grounding capacitors 720, 721 and the inductors 713, 714. Since the varactor diodes are biased backwards, the delay control is done by applying positive voltage through RF chokes 718, 719 to the common port of each varactor diode couple 716, 717. The current loop is closed through the varactor diodes and the inductors 713, 714 to ground.

The transmission line 715 of FIG. 31 is approximately a quarter wavelength in length. This specific length will cause a RF signal coming through the input port and partially reflected by the loading elements comprised of 716, 713 and 714, 717 loads to have a perfect matching at the input. This is due to the fact that the loading elements cause the same loading on the transmission line and thus the same reflections. These equal reflections are subtracted at the input because of the 180 degrees introduced on the second reflected signal in comparison to the first.

The two sections delay shifter presented in FIG. 31 may form the basic building block for a larger electrically controlled delay shift apparatus. By cascading more of these sections, one may control over larger bandwidth and delay.

An embodiment tuning apparatus for the compensation of gain difference, phase difference and delay is shown on FIG. 32. This illustrated mechanism allows instantaneous wide band loop signal cancellation to be used in linearized amplifiers. In this apparatus, the gain compensation block 723 is cascaded by a phase shifter 724 to allow for continuous phase compensation differences. The delay shifter 722 comprises the circuit shown in FIG. 31 and is cascaded by the gain and phase compensation blocks.

The gain and phase compensation blocks can be implemented as a vector modulator.

In other linearization methods, which are based on cancellation of the distortion products by vector sum, the cancellation deepness is frequency sensitive due to delay mismatches.

A method will now be presented, referring to FIG. 33 in which CDSs are incorporated into a linearized power amplifier.

First Loop.

Cancellation of the portion of the main signal at the output of the first loop is obtained by controlling the amplitude 728 and phase 729 of the upper path of the loop. The gain and phase of the first loop are adjusted by an adaptation algorithm which minimizes the error measured by the power detector 743. Since cancellation varies over frequency, the total error power over a certain bandwidth will not be optimal for a given delay mismatch. The error power is optimized by adaptation of the proposed delay shifter 727 to obtain the minimum error power level.

Second Loop.

A pilot signal is used to generate the control signals for the quadrature modulator in the error cancellation loop. The pilot P, produced by a tunable signal source 736, is injected into the input of the main amplifier through coupler 730 and cancelled at the output of the second loop by coupler 733. Cancellation of the pilot at system's output is obtained by controlling the amplitude 740 and phase 741 of the lower path of the loop. These are adjusted by an adaptation algorithm to minimize the residual pilot at the receivers output 744. Due to delay mismatch, this minimum, for a constant set of gain and phase settings, is frequency sensitive.

Thus the delay mismatch can be obtained by sampling the residual pilot by coupler 734 and measuring its level at two frequencies, when the phase 741 and amplitude 740 are optimally adjusted at one of the frequencies.

The proposed closed loop control procedure minimizes the difference between the residual pilot samples by controlling the CDS 739 to compensate delay mismatch and thereby extend the cancellation to a wider bandwidth.

Tuning the pilot's frequency to both frequency band edges is controlled by the system controller. Specifically, both frequencies are selected out of the useful band to avoid interference within the band to then be reduced by the rejection band of the output filter, and to reduce the pilot's level transmitted by the system to the maximum permitted level by the transmission standards.

A general description of the process is described in FIG. 34.

The pilot frequency is tuned to the lower edge of the operating bandwidth in 746. A known adaptive algorithm forces the amplitude 740 and phase 741 to obtain minimum loop error in 747. The amplitude and phase controls are freezed, and loop error power is recorded in 748. The pilot frequency is then tuned to the higher edge of the frequency band in 749, and the loop's error power is recorded again in 750. In 751, the difference in error level is checked. If the difference is greater than a given threshold C then a delay adjustment is provided to minimize the difference. This new process provides minimum cancellation defined by the threshold C.

VIII. An Example Implementation of an LPA

The following is a specific example implementation of the linearized power amplifier (LPA) shown in FIG. 15A.

Figure 24:
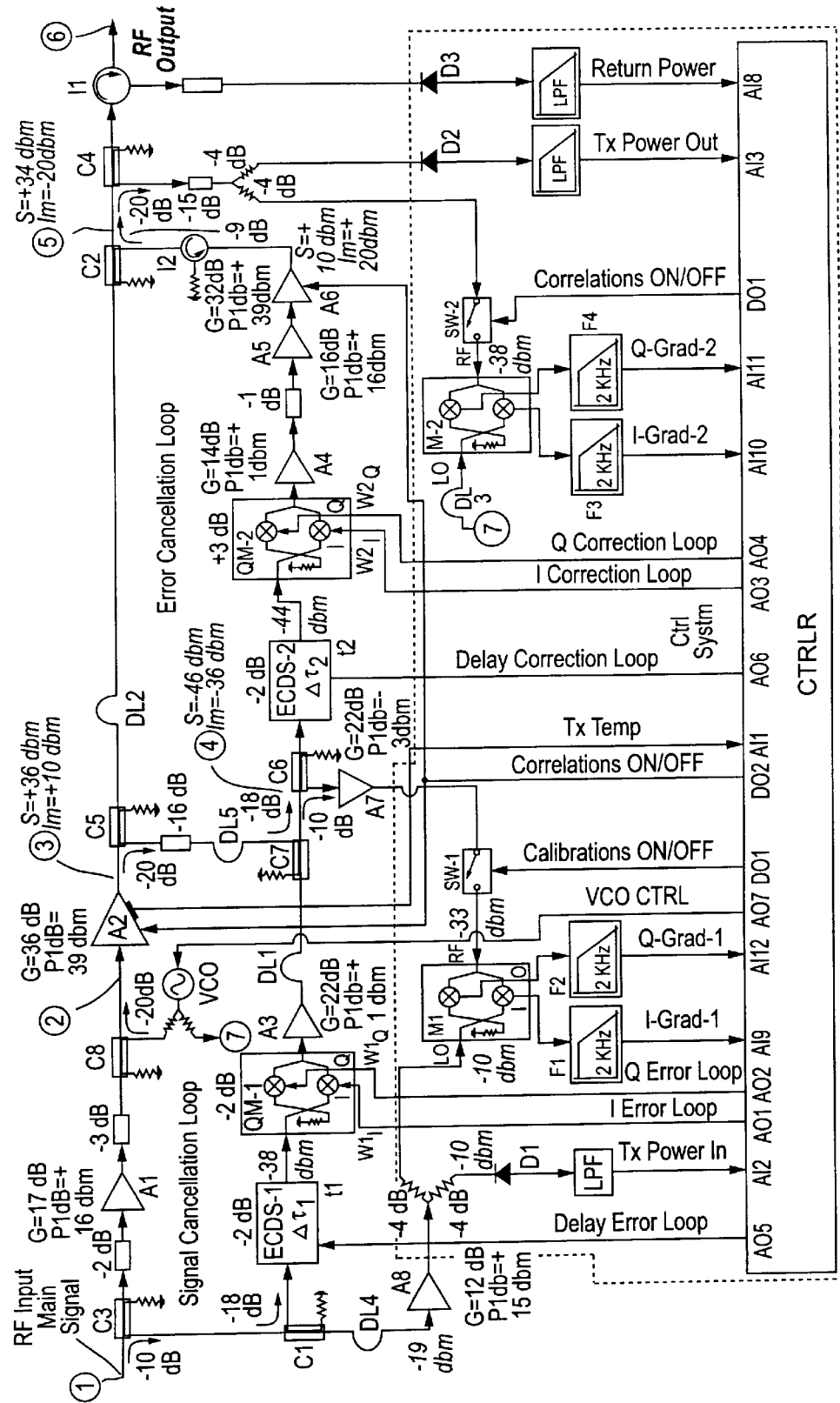
FIG. 24 is a detailed schematic of a specific implementation of an LPA circuit.

The illustrated LPA, shown in FIG. 24, comprises a feed forward amplifier and a control system. The feed forward amplifier comprises two amplifier loops arranged in a two path configuration.

The first loop provides cancellation of the main signals supplied at the input. It is intended to provide a sample of the distortion (intermodulations) to the error cancellation loop. It comprises the main amplifier at the upper path and a delay, phase and gain adjusters for the main signal at the lower path.

The second loop provides cancellation of the distortions generated by the main amplifier. The error cancellation loop amplifies the distortion supplied from the first loop and injects it to the output line at coupler C2 with equal amplitude but opposite phase to cancel the distortion at point 5. It comprises a delay, phase and gain adjusters and an auxiliary amplifier at the lower path to provide the distortion cancellation.

Signal Cancellation Loop.

The main signal is applied to the input (point 1) and is split by the coupler C3 between two paths: the main path to the power amplifier and to C1 that splits the signal between the auxiliary path and the control system.

At the main path the input signal is amplified by the driver amplifier A1 and the power amplifier A2. Coupler C8 injects the pilot signal for the correction loop (point 2).

A main signal that consist of two tones at the input at a level that provides +36 dbm at the output of A2 (point 5) produces distortion products (internmodulations) of +10 dbm (Assuming signal level which is 3 dB lower than 1 dbcp).

Coupler C5 samples the output signal of A2 and feeds the coupler C7 where a portion of the original signal present in the auxiliary path is subtracted. The sampled signal is attenuated to obtain a power level of ~18 dbm at point 4.

Delay line DL5 enables delay equalization between the upper and the lower paths of both the signal cancellation loop at point 4 and the correction loops at point 5.

The auxiliary path of the signal cancellation loop adapts the amplitude, phase and delay of the original signal to obtain optimal cancellation of the main signal at point 4. The auxiliary path was designed to avoid additional distortion products to the distortion signal received from the first loop; thus the power level into the components composing the auxiliary path of the first loop was adapted to comply with this requirement.

The auxiliary path includes an electrically controlled delay shifter (ECDS-1) for delay adjustment and a quadrature modulator QM1 for amplitude and phase adaptation. The control signals t1, $W1_I$ and $W1_Q$ are supplied from control signals.

Coupler C7 subtracts the adjusted signal from the main signal sampled from A2 by C5. The signal obtained from the output of the coupler C7 contains a portion of the original signal that remains from the cancellation, distortion products and the pilot. The level of the signals at the output is about −42 dbm. Coupler C6 samples the error signal and supplies it to the control system. The amplifier A7 amplifies the error signal to provide a level of −33 dbm at the RF input of the quadrature demodulator QM1.

Delay line DL4 enables delay adaptation between the LO and RF inputs of the quadrature demodulator M1. The signal is then amplified by A8 and is split to the LO input of M1 and to the input power detector D1 for input power measurement.

The control system assures that the remaining portion of the original signal after the cancellation is lower than the distortion level, thereby avoiding the production of distortion in the lower path in the second loop and degradation of the main signal level at the output of the system (point 6). Error Cancellation Loop.

A sample of the distortion obtained at point 4 from the first loop enters into the error cancellation loop, that adapts its amplitude, phase and delay, and injects the adjusted signal into the main path by C2 to cancel the distortion at the main amplifier's output and the pilot products in the main path at point 5. A pilot injected into the main and auxiliary paths of the second loop enables adaptation of the distortion's amplitude and phase. Thus cancellation of the pilot at point 5 results in cancellation of the distortion.

The output of the power amplifier A2 includes the main signal, distortion products, and the pilot injected into the main path by C8.

The pilot is produced by a VCO. Sweeping the VCO's frequency enables loop optimization over all of the operation frequency band of the transmitter. The frequency sweep shall be applied by changing the control voltage of the VCO by the control system. In the embodiments, the pilot has a constant envelope providing the same level of the distortion product at the output of A2 (e,g., +10 dbm).

The delay line DL2 enables delay equalization of the upper and the lower paths at point 5.

The pilot adjusted at the lower path is injected into the coupler C2 through the isolator I2. I2 reduces the level of the main signal leaks from the main path and may cause distortions in the auxiliary path. Coupler C2 enables subtraction of the adjusted pilot from the pilot presented on the main path at point 5.

The residual components of the pilot is sampled by the coupler C4 and then goes to the control system.

Circulator I1 reduces the power returns from the load, and thus maintains wideband output matching and reduces main amplifiers IMs.

The auxiliary path of the error cancellation loop enables delay, amplitude and phase adaptation of the pilot to obtain optimal cancellation of pilot at point 5. The auxiliary path includes a electrically controlled delay shifter (ECDS-2) for delay adjustment and a quadrature modulator QM2 for amplitude and phase adaptation. The control signals t2,W2$_I$ and W2$_Q$ are supplied from the control system.

The amplifiers A4 and A5 and A6 provide a gain of 62 dB to amplify the error signal to the level of +18 dbm. The auxiliary path avoids additional distortion products in this path in order to assure optimal distortion cancellation at system's output.

The control system provides the following functions:

(1) Producing of the error signals for each loop;
(2) Measuring and calculation of the error signals at each loop;
(3) Producing the control signals to the delay shifters and the quadrature modulators according to error signals measured in each loop;
(4) Controlling the pilot's frequency;
(5) Measuring the PA's temperature, average input power and average output power operation (ON/OFF);
(6) Controlling the power amplifier (A2) and Correction amplifier (A6); and
(7) Controlling the switches S1 and S2.

The control algorithm adjusts the phase and gain of the lower path in each loop to minimize the error signals at the loop's output. The error signal in the first loop corresponds to the residual original signal and in the second loop, it corresponds to the residual pilot. An algorithm for finding the value of the control signal to minimize the error power is based on the method of the LMS algorithm which searches for the zero value of the gradient. The control algorithm produces and measures the signals for the estimation of the gradient, and then calculates the value of the control signals (Weights) for phase and gain adaptation (I & Q inputs of the quadrature modulators M1 & M2) that forces the gradient to zero according to the following calculation:

$$W_I(n+1)=W_I(n)+K\Delta_I(n)$$

$$W_Q(n+1)=W_Q(n)+K\Delta_Q(n)$$

Where:

$W_I(n)$ and $W_Q(n)$ are the control signals to the quadrature modulators (M1 ,M2).

$\Delta_I(n)$ and $\Delta_Q(n)$ are the gradient estimation for each axis.

K corresponds to loop's gain

4.2 Gradient Estimation Method in the Signal Cancellation Loop

In the signal cancellation loop, the gradient is estimated according to the following expressions:

$$\frac{\partial}{\partial W_I}\{E[\varepsilon(t)^2]\} = \Delta_I(t) \cong X_I(t)\varepsilon(t) \text{ the in-phase component of the gradient}$$

$$\frac{\partial}{\partial W_Q}\{E[\varepsilon(t)^2]\} = \Delta_Q(t) \cong X_Q(t)\varepsilon(t) \text{ the quadrature component of the gradient}$$

Where $X_I(t)$ is the original signal and $X_Q(t)$ is a 90° shifted form of $X_I(t)$, and $\epsilon(t)$ is the error at loop's output. The gradient signals are produced by the product of the error and the original signal utilizing a quadrature demodulator M1. The gradient signal produced at the in-phase and quadrature outputs of M1 includes a DC component proportional to the mean value of the gradient and additional wide-band "noise."

The adaptive algorithm forces the DC values to zero by adjusting the values of the control signals W1$_I$ and W1$_Q$ (the "weights").

These signals are filtered, sampled, and averaged in every iteration of the algorithm. The low pass filters F1 and F2 that are used as anti-aliasing filters comply with the certain requirements such as the following:

(1) Band width: 1 KHz (at 3 dB points)
(2) Rejection: 20 dB at 2 KHz
(3) Ripple: ±0.2 dB maximum A rejection of 20 dB at 2 KHz assures an aliasing noise of 1% of the measured value.

The signals at the filter output are sampled by the controller at a sufficient sampling rate, e.g., of 2 KHz. The measured gradient signal includes a DC offset component produced by the mixers in the quadrature demodulator. The DC component shall be measured periodically and shall be subtracted from the measurement of the gradient signals.

4.3 The Gradient Estimation is Based on the Following Approximation of the Gradient $$\frac{\partial P_e}{\partial W} \cong \frac{P_e(W + \Delta W) - P_e(W)}{\Delta W}$$

Where $P_e = E[\epsilon(t)^2]$ is the average power of the error signal

The pilot is used to generate the control signals for the quadrature modulator in the error cancellation loop.

A pilot is injected into the input of the main amplifier and cancelled at the output of the second loop (point 5) by adaptation of the gain and phase of the lower path of the signal cancellation loop. The gradient shall be estimated by making small perturbations to the control signals $W2_I$ and $W2_Q$, measurement of the resulting power changes of the pilot signal and calculation of the gradient by:

$$\Delta_I(n) = \frac{P_I(n) - P_o(n)}{\Delta W}$$ the in-phase component of the gradient.

$$\Delta_Q(n) = \frac{P_Q(n) - P_o(n)}{\Delta W}$$ the quadrature component of the gradient.

Where:

$P_0(n) = P_e(W2_I(n)W2_Q(n))$—the power of the residual pilot's power at iteration n $P_I(n) = P_e(W2_I(n) + \Delta W, W2_Q(n))$—the power of the residual pilot's power at iteration n after a small perturbation $\Delta W$ in $W2_Q$.

$P_Q(n) = P_e(W2_I(n) + \Delta W, W2_Q(n) + \Delta W)$: the power of the residual pilot's power at iteration n after a small perturbation $\Delta W$ in $W2_I$ Then the control signal is calculated according the following relationship:

$$W2_I(n+1) = W2_I(n) + K\Delta(n)$$

$$W2_Q(n+1) = W2_Q(n) + K\Delta(n)$$

Figure 25:
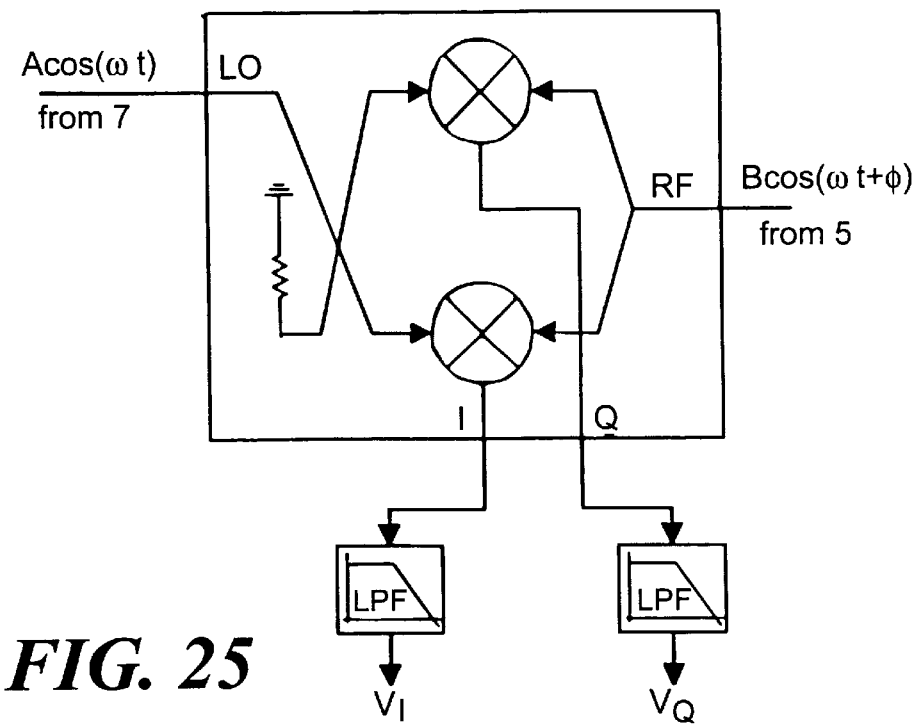
FIG. 25 is a schematic diagram of a device M2 illustrated in FIG. 24.
Figure 26:
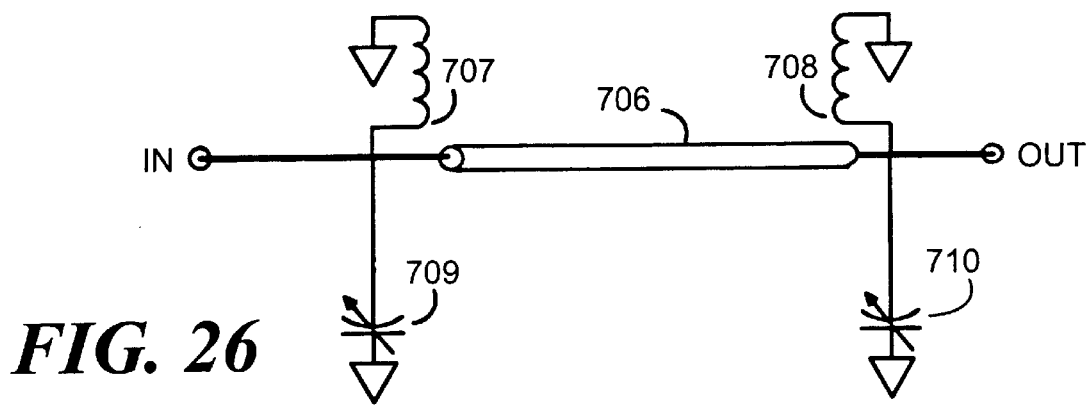
FIG. 26 is a schematic diagram of one embodiment of a controllable delay shifter (CDS)
Figure 27:
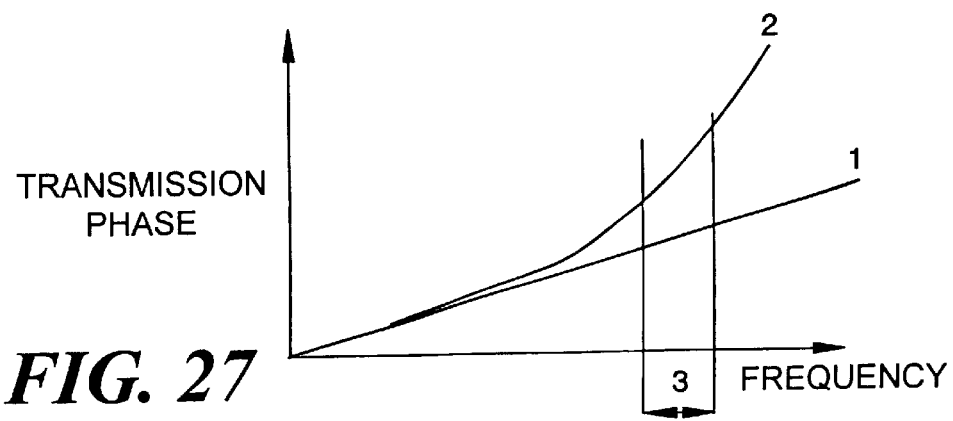
FIG. 27 is graph of transmission phase versus frequency behavior of a CDS.
Figure 28:
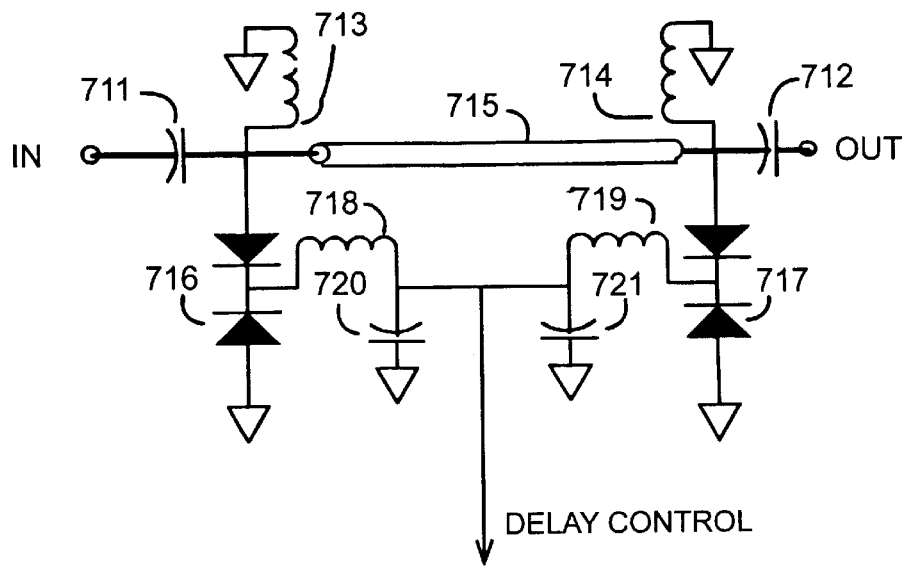
FIG. 28 is a schematic diagram of another embodiment of a CDS.

The measurement of the pilot is achieved by a correlation detector 2500 illustrated in FIG. 25, which utilizes the quadrature demodulator M2. The pilot at point 7 is used as an LO for the correlation detector and the measured power is supplied to the RF input of the correlator as described at the following description:

Referring to FIG. 25, the In-phase output of the correlator $V_I$ satisfies the following expression:

$V_I = \frac{1}{2}AB \sin \phi$ and the quadrature output $V_Q$ satisfies: $V_Q = \frac{1}{2}AB \cos \phi$.

For constant amplitude—A, the power of the pilot is proportional to the sum of squares of $V_I$ and $V_Q$, that is: $V^2 = V_I^2 + V_Q^2 = \frac{1}{4}A^2B^2$. Thus, the residual pilot's power is calculated by: $Po = I^2 + Q^2$.

The signals produced by M2 are filtered, sampled and averaged in every perturbation. The measured signals include a DC offset component produced by the mixers in the quadrature demodulator. The DC component is measured periodically and is subtracted from the measurements.

The controller may comprise a multi-purpose processor (MPP) based on the PIC 17C756 microcontroller and a 16 bit fixed point DSP based on Analog Devices ADSP 2186 component. The MPP may provide the functions for communications between the LPA and a PC. The DSP may provide the adaptation algorithms.

While the invention has been described by way of example embodiments, it is understood that the words which have been used herein are words of description, rather than words of limitation. Changes may be made, within the purview of the appended claims, without departing from the scope and the spirit of the invention in its broader aspects. Although the invention has been described herein with reference to particular structures, materials, and embodiments, it is understood that the invention is not limited to the particulars disclosed.

What is claimed is:

1. A subsystem for a cellular base station comprising:

plural active radiator units intended to be installed at the top of a base station tower, each active radiator unit comprising:
      a radiator sub unit housed in a modular housing, said radiator subunit comprising:
         a transmit path portion; and/or
         a receive path portion; and
   an antenna arrangement coupled to said radiator sub unit, said antenna arrangement including separate transmit and receive antenna elements;
   an arrangement for conducting electrical power to said RF signal amplifiers of said radiator sub units;
   an arrangement for coupling signals to be transmitted to said radiator sub unit for transmission via said transmit antenna element; and
   an arrangement for coupling signals received by said receive antenna element and processed by said radiator sub unit to a receiver.

2. A subsystem according to claim 1, wherein
   said transmit path portion comprises a transmit linearized power amplifier and a transmit signal bandpass filter.

3. A subsystem according to claim 1, wherein said receive path portion comprises a receive low noise amplifier and a receive signal bandpass filter.

4. A subsystem according to claim 1, wherein said transmit path portion is electrically isolated from said receive path portion.

5. A subsystem according to claim 1 wherein each said antenna arrangement comprises one or more antenna elements.

6. A subsystem according to claim 1 further comprising one or more add-on radiator elements coupled to at least one of said antenna arrangements.

7. A subsystem according to claim 1 wherein said radiator subunit contains two or more transmit path portions, each such transmit path portion including a transmit amplifier and band pass filter.

8. A subsystem according to claim 1 wherein said radiator subunit contains two or more receive path portions, each such receive path portion including a receive band pass filter and a receive amplifier.

9. A subsystem according to claim 1 wherein said radiator subunit is constructed as a single integrated structural module protected from the outside environment.

10. A subsystem according to claim 1 wherein plural transmit path portions and plural receive path portions are constructed and arranged as transmit radiator subunit modules and receive radiator subunit modules and mounted on a common support structure.

11. A subsystem according to claim 1 further comprising at least one radiator assembly, comprising:
- a serrated reflector;
- a radome; and
- plural transmit-receive antenna pairs.

12. A subsystem according to claim 1 further comprising at least one module housing structure constructed and arranged to house a radiator subunit, comprising:
- an antenna interface;
- a base station interface;
- cooling fins constructed and arranged to dissipate heat from circuit elements contained within the module housing;
- a transmit side compartment for containing elements of the transmit path portion; and
- a receive side compartment for containing elements of the receive path portion.

13. A communication site for a cellular communication system, comprising:
- a base transceiver system;
- an indoor control unit coupled to the base transceiver system;
- a radiator subunit coupled to the indoor control unit, the radiator subunit including a transmit path portion and a receive path portion; and
- an antenna arrangement coupled to the radiator subunit, the antenna arrangement having separate transmit and receive antenna elements, the transmit antenna element being coupled to the transmit path portion of the radiator subunit and the receive antenna element being coupled to the receive path portion of the radiator subunit, wherein the indoor control unit is constructed and arranged to interface the radiator subunit with the base transceiver system and to control and monitor the radiator subunit including providing an RF interface between each radiator subunit and the base transceiver system.

14. A communication site according to claim 13 wherein:

the transmit path portion comprises a variable gain transmit amplifier, a linearized power amplifier coupled to the output of the variable gain transmit amplifier, and a transmit band pass filter coupled to the output of the linearized power amplifier.

15. A communication site according to claim 13 wherein:

the receive path portion comprises a receive band pass filter coupled to receive signals from the receive antenna element, a linear low noise amplifier coupled to the output of the receive band pass filter and a variable gain receive amplifier coupled to receive signals from the linear low noise amplifier.

16. A communication site according to claim 13 further comprising:
- an internal controller, located within the radiator subunit, constructed and arranged to control the gains of the variable gain transmit amplifier and variable gain receive amplifier.

* * * * *